United States Patent
Ohno et al.

(10) Patent No.: US 10,647,172 B2
(45) Date of Patent: May 12, 2020

(54) ELECTROMAGNETIC SUSPENSION APPARATUS

(71) Applicant: HONDA MOTOR CO., LTD., Tokyo (JP)

(72) Inventors: Satoshi Ohno, Wako (JP); Tomoya Toyohira, Wako (JP); Takafumi Kato, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 16/005,974

(22) Filed: Jun. 12, 2018

(65) Prior Publication Data

US 2018/0361814 A1    Dec. 20, 2018

(30) Foreign Application Priority Data

Jun. 16, 2017  (JP) ................ 2017-119122

(51) Int. Cl.
*B60G 17/015*  (2006.01)
*B60G 17/017*  (2006.01)
(Continued)

(52) U.S. Cl.
CPC ....... *B60G 17/0152* (2013.01); *B60G 17/017* (2013.01); *B60G 17/0157* (2013.01);
(Continued)

(58) Field of Classification Search
CPC .............. B60G 17/0152; B60G 17/017; B60G 2202/30; B60G 2400/25; B60G 2400/202; B60G 2204/62; B60G 2500/10
See application file for complete search history.

(56) References Cited

U.S. PATENT DOCUMENTS 5,983,150 A * 11/1999 Sasaki ................ B60G 17/0165
                                                          701/38
8,641,052 B2 * 2/2014 Kondo .................... B60G 11/58
                                                          280/5.514
(Continued)

FOREIGN PATENT DOCUMENTS

JP     H06-344739 A     12/1994
JP     10-227322        8/1998
(Continued)

OTHER PUBLICATIONS

Yamashita et al., Suspension System for Vehicle, May 7, 2009, EPO, JP 2009-096413 A, Machine Translation of Description (Year: 2009).*

(Continued)

*Primary Examiner* — James A English
(74) *Attorney, Agent, or Firm* — Rankin, Hill & Clark LLP

(57) ABSTRACT

An object of the present invention is to obtain an electromagnetic suspension apparatus capable of meeting a request to improve ride comfort irrespective of a magnitude of a spring constant preset in a spring member. The electromagnetic suspension apparatus includes an electromagnetic actuator that generates a driving force related to vibration damping of the vehicle body, an information acquisition unit that acquires information on a stroke position of the electromagnetic actuator, and an ECU that calculates a target driving force of the electromagnetic actuator and controls a driving force of the electromagnetic actuator using the calculated target driving force. When the stroke position acquired by the information acquisition unit is in a neutral range including a neutral position, the ECU corrects the target driving force so as to reduce a spring force related to (Continued)

the spring member as compared with when the stroke position is in a non-neutral range.

6 Claims, 12 Drawing Sheets

(51) Int. Cl.
*B60G 17/019* (2006.01)
*B60G 17/016* (2006.01)

(52) U.S. Cl.
CPC ... *B60G 17/0162* (2013.01); *B60G 17/01933* (2013.01); *B60G 2202/30* (2013.01); *B60G 2202/42* (2013.01); *B60G 2204/62* (2013.01); *B60G 2400/0521* (2013.01); *B60G 2400/0522* (2013.01); *B60G 2400/0523* (2013.01); *B60G 2400/202* (2013.01); *B60G 2400/204* (2013.01); *B60G 2400/25* (2013.01); *B60G 2400/252* (2013.01); *B60G 2400/40* (2013.01); *B60G 2400/41* (2013.01); *B60G 2400/42* (2013.01); *B60G 2400/8422* (2013.01); *B60G 2500/10* (2013.01); *B60G 2500/104* (2013.01); *B60G 2500/20* (2013.01); *B60G 2800/16* (2013.01); *B60G 2800/24* (2013.01)

(56) References Cited

U.S. PATENT DOCUMENTS

| | | | | |
|---|---|---|---|---|
| 2004/0154886 | A1* | 8/2004 | Hio | B60G 17/0157 188/266 |
| 2008/0009992 | A1* | 1/2008 | Izawa | B60G 17/08 701/37 |
| 2011/0025000 | A1* | 2/2011 | Inoue | B60G 17/0157 280/5.507 |
| 2011/0218707 | A1* | 9/2011 | Inoue | B60G 17/0157 701/37 |
| 2018/0297434 | A1* | 10/2018 | Ohno | B60G 17/0157 |
| 2018/0361814 | A1* | 12/2018 | Ohno | B60G 17/0152 |
| 2018/0361816 | A1* | 12/2018 | Ohno | B60G 5/02 |

FOREIGN PATENT DOCUMENTS

| | | |
|---|---|---|
| JP | 2009-18720 | 1/2009 |
| JP | 2009-096413 A | 5/2009 |
| JP | 2010-132222 A | 6/2010 |

OTHER PUBLICATIONS

Tetsuya Arai, Suspension for Vehicle, May 7, 2009, EPO, JP H06-344739 A, Machine Translation of Description (Year: 1994).*
Japanese Office Action dated Sep. 18, 2018, 3 pages.

* cited by examiner

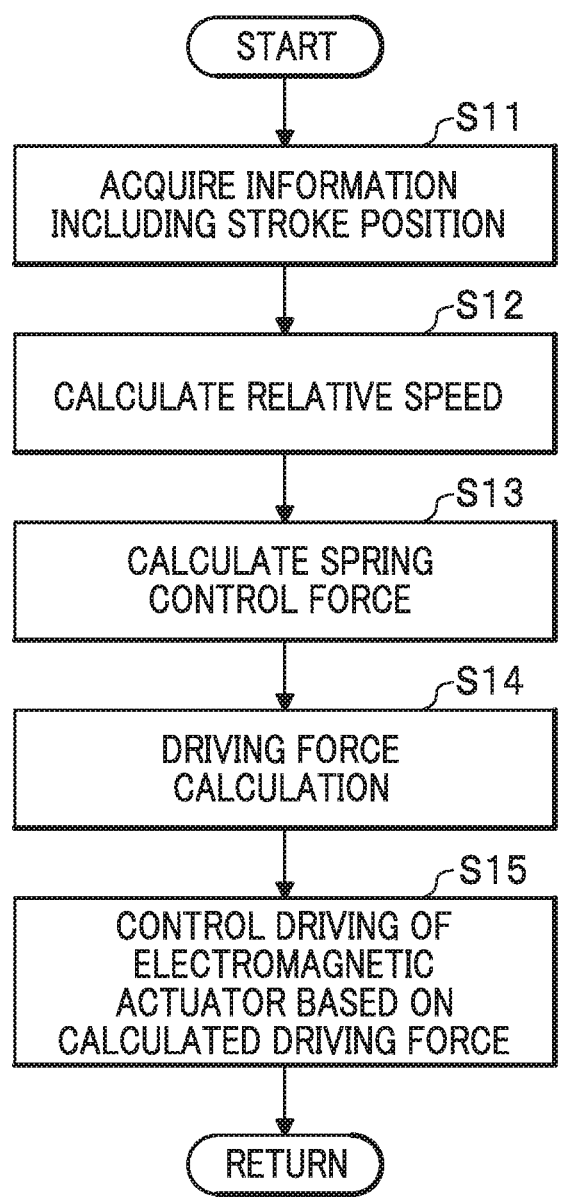

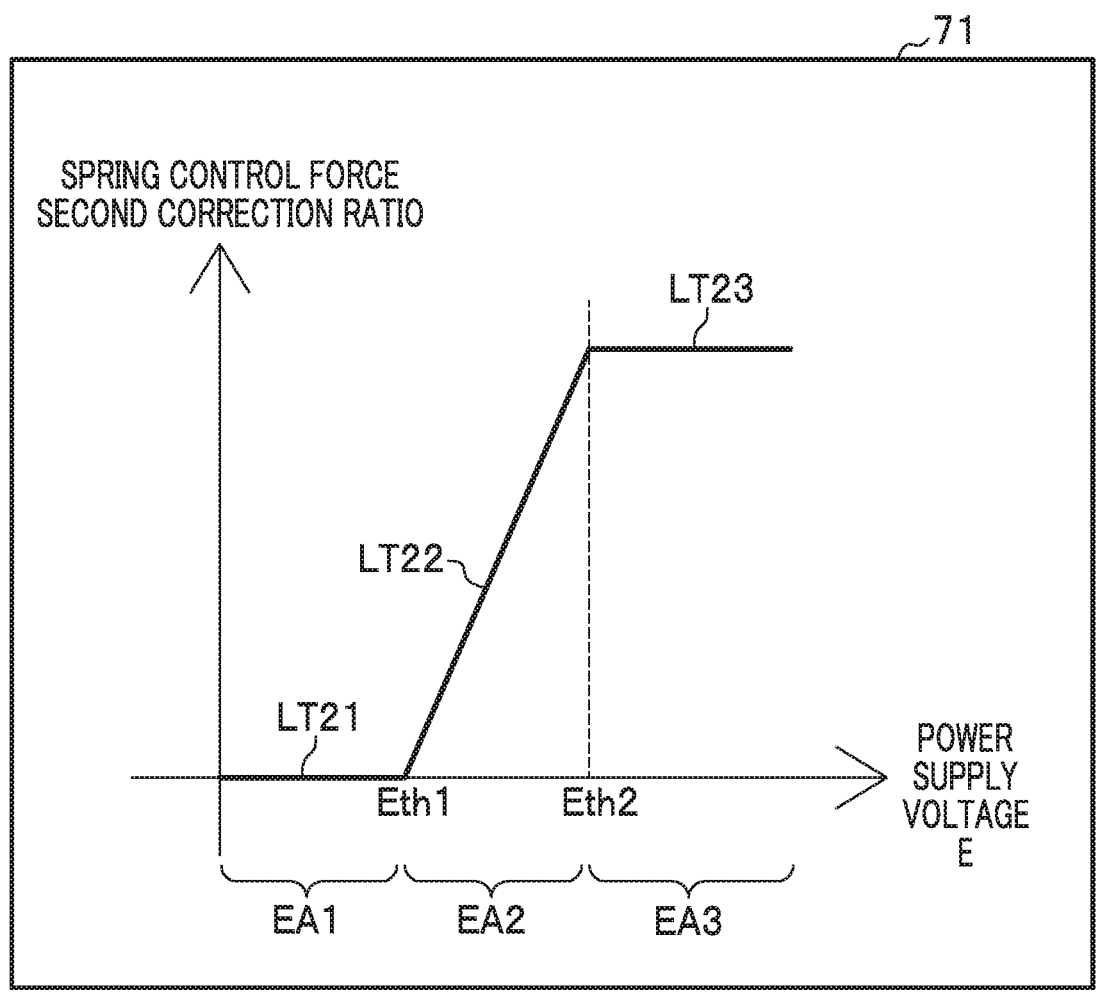

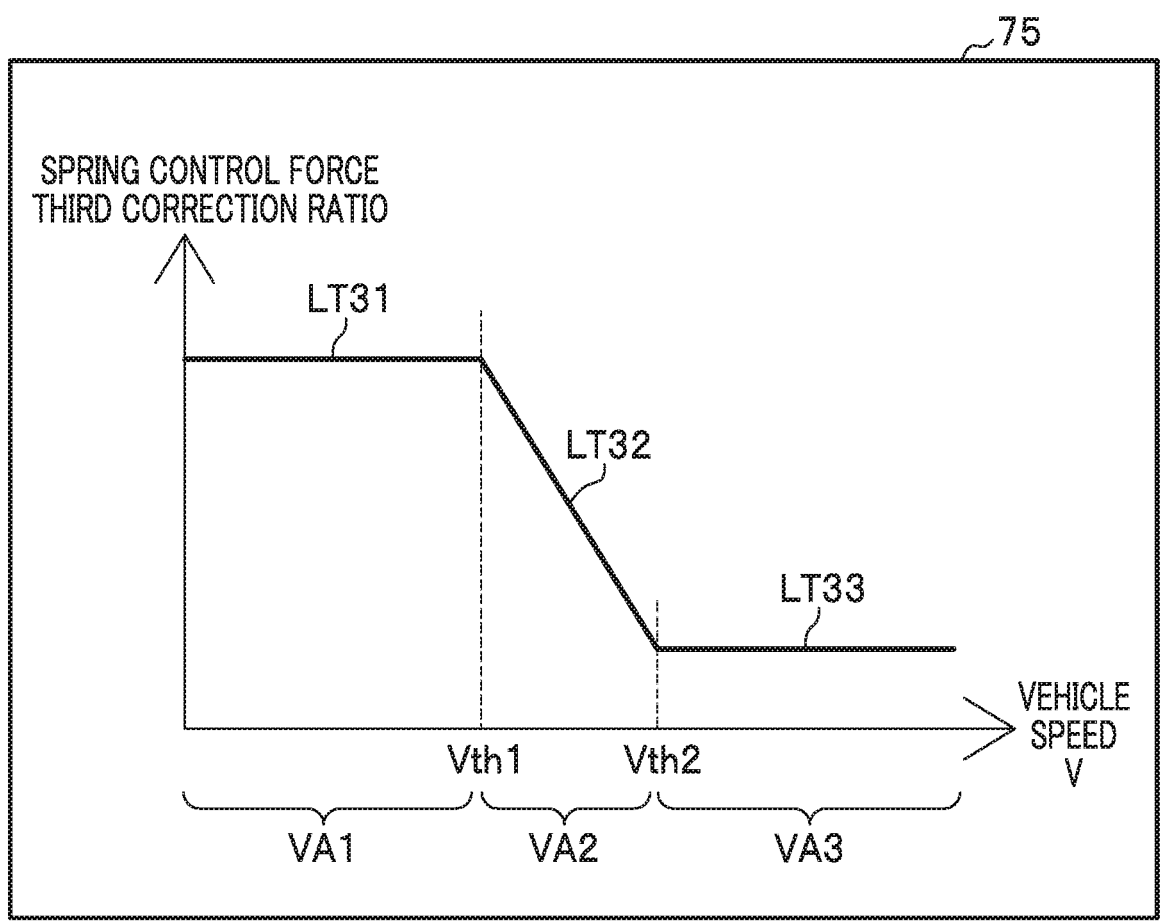

ELECTROMAGNETIC SUSPENSION APPARATUS

CROSS REFERENCE TO RELATED APPLICATIONS

This application claims the foreign priority benefit under Title 35, United States Code, § 119 (a)-(d) of Japanese Patent Application No. 2017-119122, filed on Jun. 16, 2017, the disclosure of which is herein incorporated by reference in its entirety.

TECHNICAL FIELD

The present invention relates to an electromagnetic suspension apparatus including an electromagnetic actuator which is provided in parallel with a spring member provided between a vehicle body and a wheel of a vehicle and generates a driving force related to vibration damping of the vehicle body.

BACKGROUND ART

Conventionally, there has been known an electromagnetic suspension apparatus including an electromagnetic actuator which is provided in parallel with a spring member provided between a vehicle body and a wheel of a vehicle and generates a driving force related to vibration damping of the vehicle body by an electric motor (for example, see Patent Document 1). The electromagnetic actuator is configured to include a ball screw mechanism in addition to the electric motor. The electromagnetic actuator operates to generate the driving force related to the vibration damping of the vehicle body by converting rotational motion of the electric motor into linear motion of the ball screw mechanism.

CITATION LIST

Patent Literature

Patent Document 1: Japanese Patent Application Publication No. 2010-132222

SUMMARY OF INVENTION

Technical Problem

However, in the electromagnetic suspension apparatus according to Patent Document 1, it is not disclosed nor suggested that a spring force of the spring member is adjusted according to a stroke position of the electromagnetic actuator. Therefore, depending on a magnitude of a spring constant preset in the spring member, there has been room for improvement in view of improving ride comfort.

The present invention has been made in view of the above circumstances, and an object of the present invention is to provide an electromagnetic suspension apparatus capable of meeting a request to improve the ride comfort irrespective of the magnitude of the spring constant preset in the spring member.

Solution to Problem

In order to achieve the above object, an aspect of the present invention is an electromagnetic suspension apparatus including an electromagnetic actuator that is provided in parallel with a spring member provided between a vehicle body and a wheel of a vehicle and generates a driving force related to vibration damping of the vehicle body, an information acquisition unit that acquires information on a stroke position of the electromagnetic actuator, and a driving force control unit that calculates a target driving force of the electromagnetic actuator and controls a driving force of the electromagnetic actuator using the calculated target driving force, wherein when the stroke position acquired by the information acquisition unit is in a neutral range including a neutral position, the driving force control unit corrects the target driving force so as to reduce a spring force related to the spring member as compared with when the stroke position is in a non-neutral range.

Advantageous Effects of Invention

According to the present invention, it is possible to meet the request to improve the ride comfort irrespective of the magnitude of the spring constant preset in the spring member.

BRIEF DESCRIPTION OF DRAWINGS

FIG. 5 is a flowchart for explaining an operation common to the electromagnetic suspension apparatus 11 according to the first to fourth embodiments of the present invention;

FIG. 6B is an explanatory diagram of a spring control force second correction ratio map included in the driving force calculation unit shown in FIG. 6A;

FIG. 7B is an explanatory diagram of a spring control force third correction ratio map included in the driving force calculation unit shown in FIG. 7A;

DESCRIPTION OF EMBODIMENTS

Figure 1:
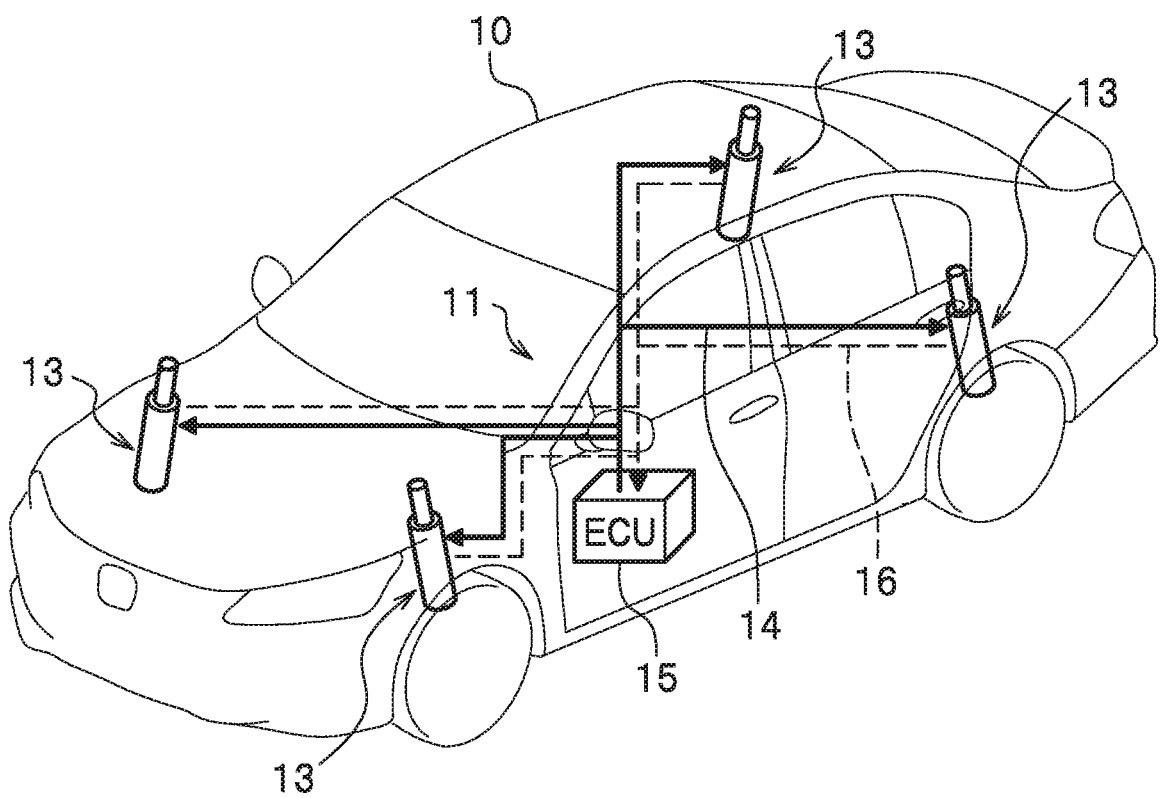
FIG. 1 is an overall configuration diagram of an electromagnetic suspension apparatus 11 according to a first to fourth embodiments of the present invention.

An electromagnetic suspension apparatus according to a first to fourth embodiments of the present invention will be described in detail with reference to the drawings below. In the following drawings, the same members or corresponding members are denoted by the same reference numerals. In addition, the size and shape of the member may be schematically illustrated by being deformed or exaggerated for convenience of explanation.

[Basic Configuration Common to Electromagnetic Suspension Apparatus 11 According to First to Fourth Embodiments of the Present Invention]

Figure 2:
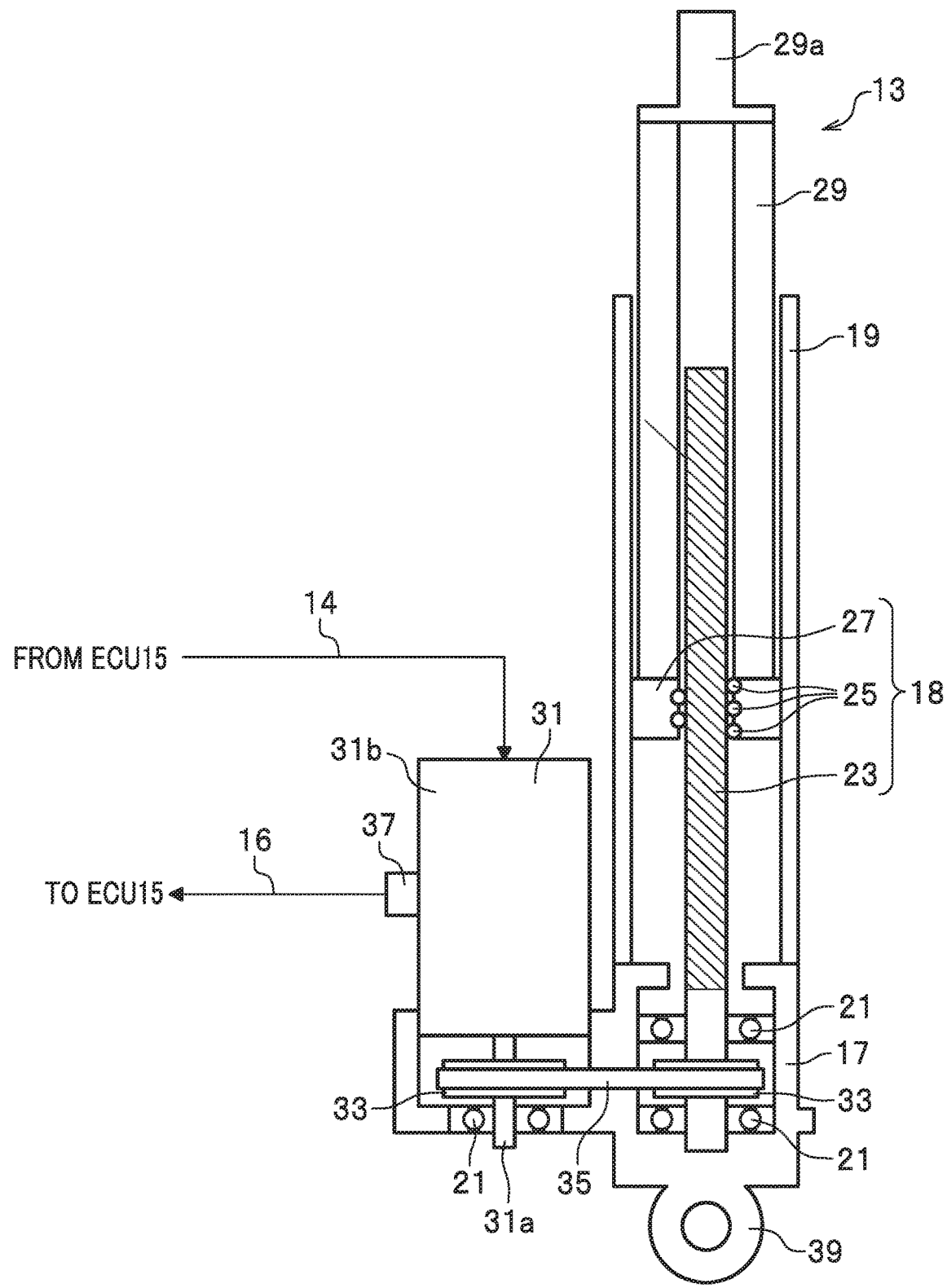
FIG. 2 is a partial cross-sectional view of an electromagnetic actuator provided in the electromagnetic suspension apparatus.

First, a basic configuration common to an electromagnetic suspension apparatus 11 according to the first to fourth embodiments of the present invention will be described with reference to FIGS. 1, 2. FIG. 1 is an overall configuration diagram common to the electromagnetic suspension apparatus 11 according to the first to fourth embodiments of the present invention. FIG. 2 is a partial cross-sectional view of an electromagnetic actuator 13 constituting a part of the electromagnetic suspension apparatus 11.

As shown in FIG. 1, the electromagnetic suspension apparatus 11 according to the first to fourth embodiments of the present invention includes a plurality of electromagnetic actuators 13 respectively provided for wheels of a vehicle 10, and an electronic control unit (hereinafter referred to as an "ECU") 15. The plurality of electromagnetic actuators 13 and the ECU 15 are connected to each other via a power supply line 14 (see a solid line in FIG. 1) for supplying drive control power from the ECU 15 to the plurality of electromagnetic actuators 13 and via a signal line 16 (see a dashed line in FIG. 1) for transmitting a stroke position of the electromagnetic actuator 13 from each of the plurality of electromagnetic actuators 13 to the ECU 15. In the present embodiment, four electromagnetic actuators 13 are respectively provided for the wheels including front wheels (left front wheel/right front wheel) and rear wheels (left rear wheel/right rear wheel).

In the embodiments of the present invention, each of the plurality of electromagnetic actuators 13 has a common configuration. Therefore, the plurality of electromagnetic actuators 13 will be described by describing a configuration of one electromagnetic actuator 13.

As shown in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a base end of the ball screw shaft 23 rotatably axially via the ball bearing 21. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25, and converts rotational motion of the ball screw shaft 23 into linear motion. The inner tube 29 connected to the nut 27 is integrated with the nut 27 and displaced in an axial direction of the outer tube 19.

As shown in FIG. 2, the electromagnetic actuator 13 includes an electric motor 31, a pair of pulleys 33, and a belt 35 in order to transmit a rotational driving force to the ball screw shaft 23. The electric motor 31 is provided on the base housing 17 so as to be arranged in parallel with the outer tube 19. The pulleys 33 are respectively attached to a motor shaft 31a of the electric motor 31 and the ball screw shaft 23. The belt 35 for transmitting the rotational driving force of the electric motor 31 to the ball screw shaft 23 is suspended on the pair of pulleys 33.

The electric motor 31 is provided with a resolver 37 for detecting a rotation angle signal of the electric motor 31. The rotation angle signal of the electric motor 31 detected by the resolver 37 is sent to the ECU 15 via the signal line 16. In the present embodiment, a rotation angle of the electric motor 31 can be replaced with the stroke position of the electromagnetic actuator 13. This is because the stroke position of the electromagnetic actuator 13 is displaced to an expansion side or a contraction side (see FIG. 2) according to a displacement of the rotation angle of the electric motor 31. The electric motor 31 is controlled to be rotationally driven in accordance with the drive control power to be supplied to each of the plurality of electromagnetic actuators 13 via the power supply line 14 by the ECU 15.

As shown in FIG. 2, in the present embodiment, a dimension in the axial direction of the electromagnetic actuator 13 is shortened by employing a layout in which the motor shaft 31a of the electric motor 31 and the ball screw shaft 23 are arranged substantially in parallel to be connected to each other. However, another layout may be employed in which the motor shaft 31a of the electric motor 31 and the ball screw shaft 23 are coaxially arranged to be connected to each other.

As shown in FIG. 2, in the electromagnetic actuator 13 according to the present embodiment, a connecting portion 39 is provided at a lower end of the base housing 17. The connecting portion 39 is connected and fixed to an unsprung member (not shown: a lower arm, a knuckle, etc. on the wheel side). On the other hand, the upper end 29a of the inner tube 29 is connected and fixed to a sprung member (not shown: a strut tower, etc. on a vehicle body side). In short, the electromagnetic actuator 13 is arranged in parallel with a mechanical spring member (not shown) provided between the vehicle body and the wheel of the vehicle 10.

The electromagnetic actuator 13 configured as described above operates as follows. That is, for example, it is assumed that an external force related to an upward vibration is input to the connecting portion 39 from the wheel side of the vehicle 10. In this case, the inner tube 29 and the nut 27 try to integrally descend with respect to the outer tube 19 to which the external force related to the upward vibration is applied. In response to this, the ball screw shaft 23 tries to rotate in a direction following the nut 27 descending. At this time, the rotational driving force of the electric motor 31 in a direction preventing the nut 27 from descending is generated. The rotational driving force of the electric motor 31 is transmitted to the ball screw shaft 23 via the belt 35. In this way, the vibration transmitted from the wheel side to the vehicle body side is attenuated by applying a damping force (force in a direction different from a direction of the stroke speed) which is a reaction force against the external force related to the upward vibration to the ball screw shaft 23.

[Internal Configuration of ECU 15]

Figure 3:
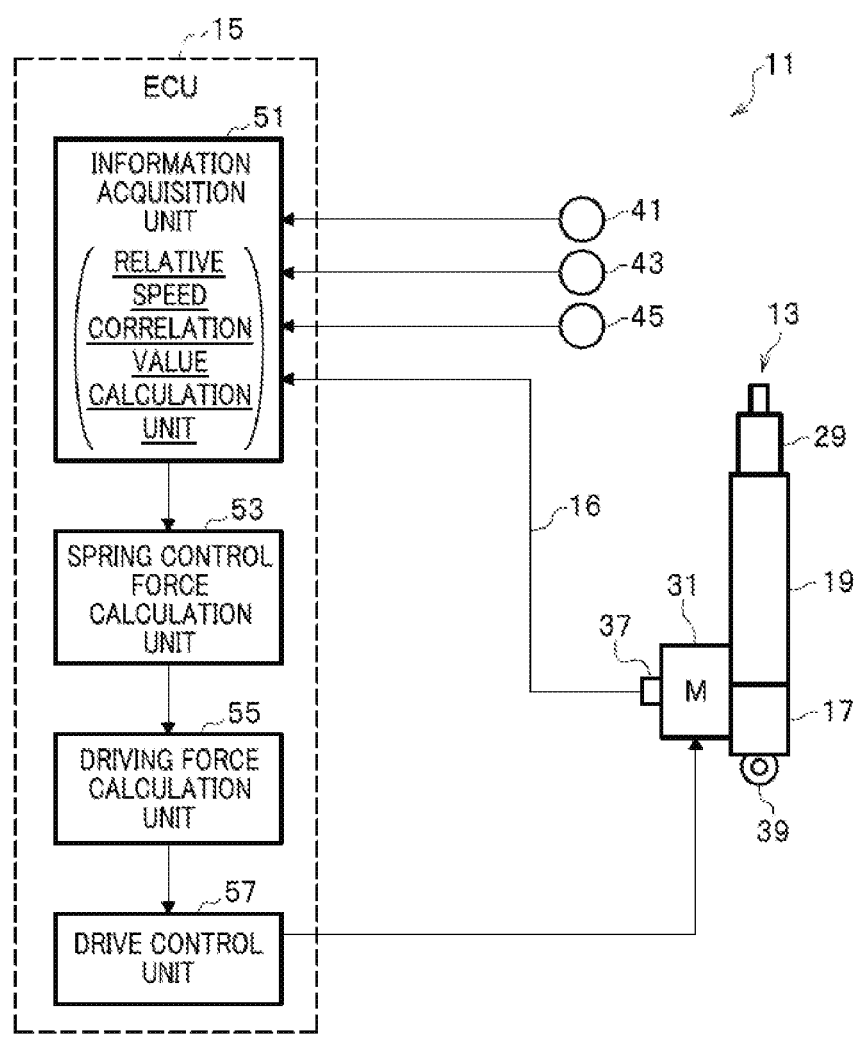
FIG. 3 is an internal configuration diagram of an ECU provided in the electromagnetic suspension apparatus.

Next, an internal configuration of the ECU 15 provided in the electromagnetic suspension apparatus 11 will be described with reference to FIG. 3. FIG. 3 is an internal configuration diagram of the ECU 15 provided in the electromagnetic suspension apparatus 11.

The ECU 15 includes a microcomputer for performing various arithmetic processing. The ECU 15 controls driving of each of the plurality of electromagnetic actuators 13 based on the rotation angle of the electric motor 31 detected by the resolver 37, that is, the stroke position or the like of the electromagnetic actuator 13, so as to have a driving force control function for generating the driving force related to vibration damping of the vehicle body. The ECU 15 corresponds to a "driving force control unit" of the present invention. In order to realize such a driving force control function, the ECU 15 includes an information acquisition unit 51, a spring control force calculation unit 53, a driving force calculation unit 55, and a drive control unit 57 as shown in FIG. 3.

The information acquisition unit 51 acquires the rotation angle of the electric motor 31 detected by the resolver 37, that is, information on the stroke position of the electromagnetic actuator 13. Further, the information acquisition unit 51 acquires information on a power supply voltage E detected by a voltage sensor 41, a vehicle speed V detected by a vehicle speed sensor 43, and a yaw rate Y detected by a yaw rate sensor 45. Vehicle state information including the stroke position of the electromagnetic actuator 13, the power supply voltage E, the vehicle speed V, and the yaw rate Y acquired by the information acquisition unit 51 is sent to the spring control force calculation unit 53 and the driving force calculation unit 55.

Further, the information acquisition unit 51 acquires a relative speed (hereinafter simply referred to as "relative speed" in some cases) between the sprung member and the unsprung member of the vehicle 10 by time-differentiating the rotation angle of the electric motor 31. Incidentally, the relative speed thus calculated has a strong correlation with a stroke speed of the ball screw shaft 23 and a rotational angular speed of the electric motor 31. That is, the relative speed can be used in place of the stroke speed of the ball screw shaft 23 and the rotational angular speed of the electric motor 31. A time-series signal of the relative speed calculated (acquired) by the information acquisition unit 51 is sent to the driving force calculation unit 55.

The spring control force calculation unit 53 calculates a spring control force for correcting a spring force related to the mechanical spring member with reference to the vehicle state information (stroke position, power supply voltage E, vehicle speed V, and yaw rate Y) acquired by the information acquisition unit 51 and a spring control force first, second, third, and fourth correction ratio maps 65, 71, 75, and 77 described below. Information on the spring control force calculated by the spring control force calculation unit 53 is sent to the driving force calculation unit 55. A content of calculation performed by the spring control force calculation unit 53 will be described in detail below.

The driving force calculation unit 55 calculates a reference value of the damping force with reference to information on a relative speed acquired by the information acquiring unit 51 and a damping force map 61 described below, and calculates a target driving force by adding the spring control force calculated by the spring control force calculation unit 53 to the calculated reference value of the damping force. A driving force control signal for realizing the target driving force which is a calculation result by the driving force calculation unit 55 is sent to the drive control unit 57. A content of calculation performed by the driving force calculation unit 55 will be described in detail below.

The drive control unit 57 supplies the drive control power to the electric motors 31 respectively provided in the plurality of electromagnetic actuators 13 according to the driving force control signal sent from the driving force calculation unit 55, and thus independently controls driving of each of the plurality of electromagnetic actuators 13. For example, an inverter control circuit can be suitably used for generating the drive control power to be supplied to the electric motor 31.

[Block Configuration of Spring Control Force Calculation Unit 53, Driving Force Calculation Unit 55, and their Surroundings According to First Embodiment]

Figure 4A:
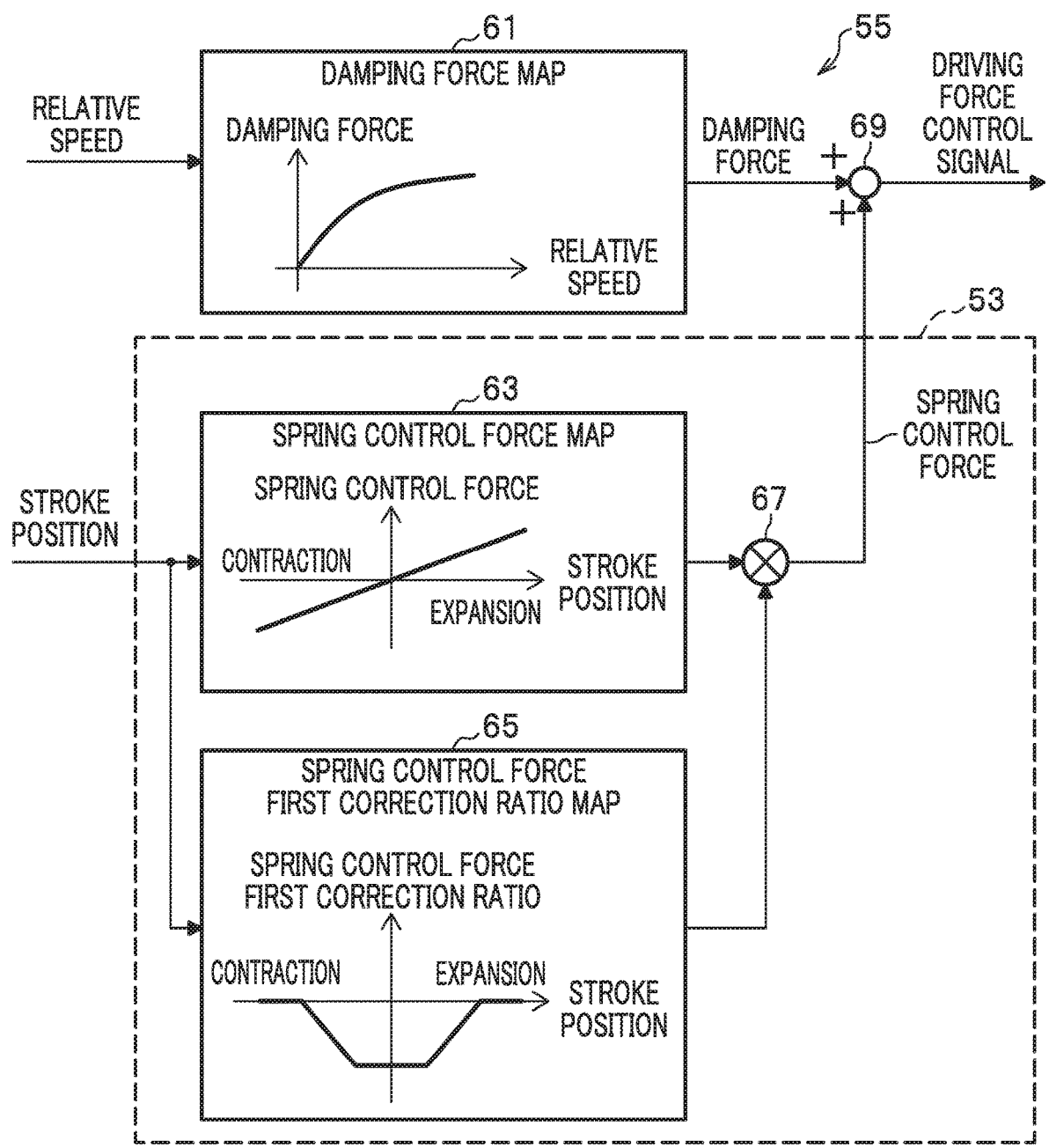
FIG. 4A is a block configuration diagram of a spring control force calculation unit, a driving force calculation unit, and their surroundings of the ECU provided in the electromagnetic suspension apparatus according to a first embodiment.
Figure 4B:
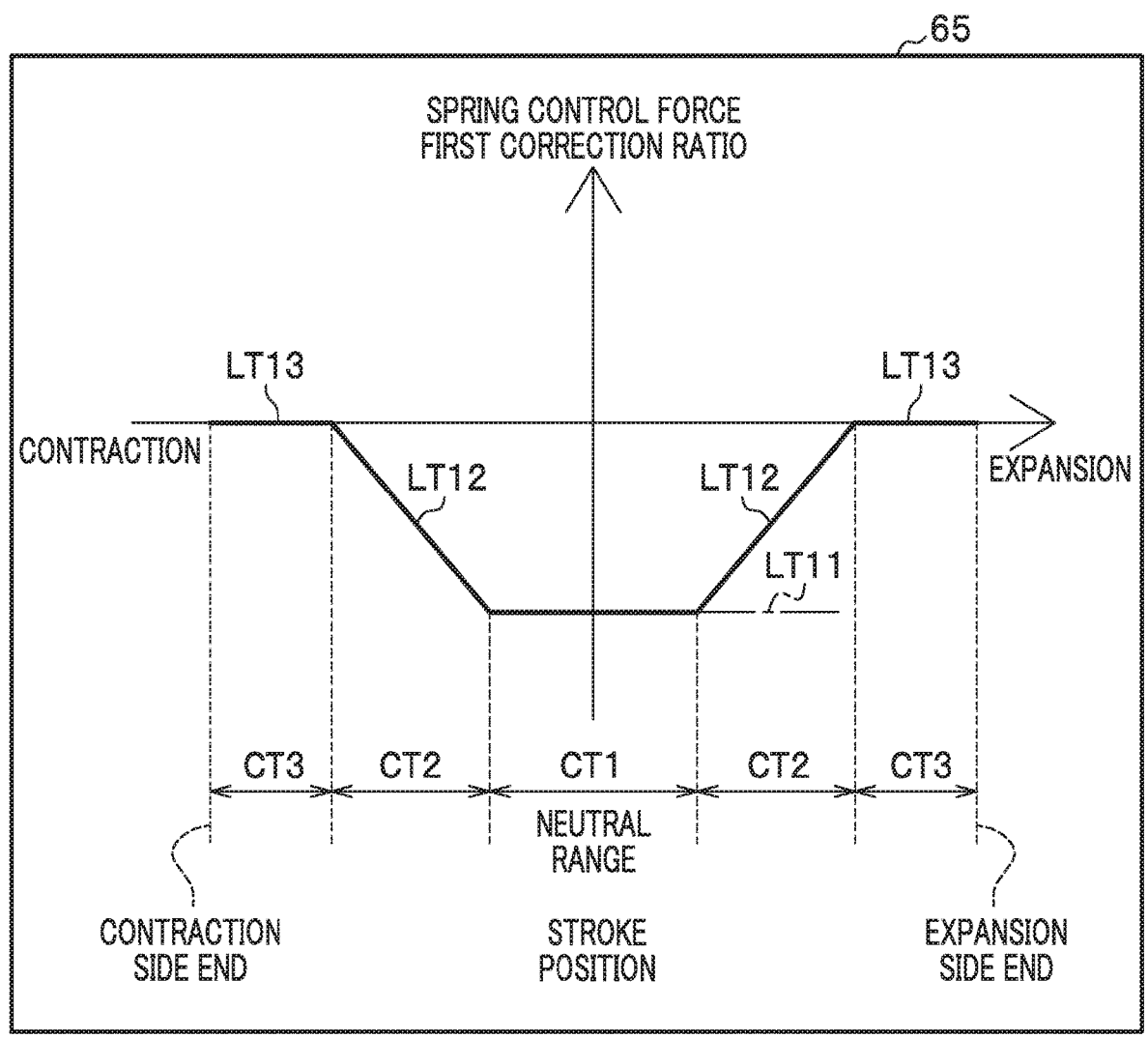
FIG. 4B is an explanatory diagram of a spring control force first correction ratio map included in the driving force calculation unit shown in FIG. 4A.

Next, a block configuration of the spring control force calculation unit 53, the driving force calculation unit 55, and their surroundings of the ECU 15 included in the electromagnetic suspension apparatus 11 according to the first embodiment will be described with reference to FIGS. 4A, 4B. FIG. 4A is a block configuration diagram of the spring control force calculation unit 53, the driving force calculation unit 55, and their surroundings according to the first embodiment. FIG. 4B is an explanatory diagram of a spring control force first correction ratio map 65 included in the driving force calculation unit 55 shown in FIG. 4A.

As shown in FIG. 4A, the spring control force calculation unit 53 according to the first embodiment is configured to include a spring control force map 63, a spring control force first correction ratio map 65, and a multiplier 67.

As shown in FIG. 4A, a reference value of the spring control force which changes in association with a change in the stroke position is stored in the spring control force map 63. The reference value of the spring control force is actually stored as a value of a spring control force current. In an example shown in FIG. 4A, the spring control force is set to linearly increase as the stroke position is shifted to an expansion side or a compression side with respect to a neutral position. When the stroke position is in the neutral position, the corresponding spring control force is zero. The spring control force calculation unit 53 according to the first embodiment calculates the reference value of the spring control force corresponding to the stroke position with reference to the information on the stroke position acquired by the information acquisition unit 51 and the stored content in the spring control force map 63. The reference value of the spring control force obtained in this way is sent to the multiplier 67.

As shown in FIG. 4A, a value of the spring control force first correction ratio which changes in association with the change in the stroke position is stored in the spring control force first correction ratio map 65. For the spring control force first correction ratio, a value between 0 and 1 (including 0 and 1) is used. In the spring control force calculation unit 53 according to the first embodiment, the value of the spring control force first correction ratio is multiplied by the reference value of the spring control force. Thus, the reference value of the spring control force is corrected to a value suitable for the stroke position changing from moment to moment.

Here, the spring control force first correction ratio characteristic stored in the spring control force first correction ratio map 65 will be described with reference to FIG. 4B. When the stroke position is in a neutral range CT1 including the neutral position, a fixed value "−1" is set as a value of a spring control force first correction ratio LT 11. When the stroke position is in intermediate ranges CT2, CT2 between the neutral range CT1 and the expansion side and contraction side end ranges CT3, CT3, a variable value which gradually increases linearly as the stroke position approaches an end of the expansion side or an end of the contraction side from the neutral position is set as a value of a spring control force first correction ratio LT12. When the stroke position is in the expansion side end range CT3 near the expansion side end or in the contraction side end range CT3 near the contraction side end, a fixed value "0" is set as a value of a spring control force first correction ratio LT13. A width of the neutral range CT1 with respect to the stroke range of the electromagnetic actuator 13 and a width of the expansion side and contraction side end ranges CT3 are set to appropriate values through experiments, simulations or the like in consideration of a degree to try to reduce the spring constant of the spring member or of preventing the electromagnetic actuator 13 from falling into a full bump or a full rebound state.

When the stroke position is in the neutral range CT1 including the neutral position, it is because the following reason that the value of the spring control force first correction ratio LT11 is set so that the spring control force is a negative value having a larger absolute value as compared with when the stroke position is in the non-neutral ranges CT2 and CT3 excluding the neutral range CT1. That is, when the stroke position is in the neutral range CT1 including the neutral position, reducing the spring force related to the mechanical spring member has the same meaning as reducing the spring constant related to the spring member. The spring constant related to the mechanical spring member is preset to a relatively large value in order to meet a request to reliably support the vehicle body of the vehicle 10 by the spring member even when the electromagnetic actuator 13 fails. Therefore, when the stroke position is in the neutral range CT1 including the neutral position, the value of the spring control force first correction ratio LT11 is set to a negative value having a larger absolute value than LT12, LT13 to reduce the spring force related to the spring member. Thus, it is intended to improve the ride comfort by correcting the spring control force to the negative value having the large absolute value (by obtaining the target driving force by subtracting the spring control force from the damping force).

It is because the following reason that the fixed value "0" is set as the value of the spring control force first correction ratio LT13 when the stroke position is in the expansion side or the contraction side end range CT3. That is, when the stroke position is in the expansion side or the contraction side end range CT3, there is a possibility that the electromagnetic actuator 13 is brought into a full bump or full rebound state. Therefore, when the stroke position is in the expansion side or the contraction side end range CT3, the spring control force is corrected so as to reduce the degree of reducing the spring force related to the spring member compared with when the stroke position is in the intermediate range CT2. Incidentally, "reducing the degree of reducing the spring force related to the spring member" includes a mode in which the spring force related to the spring member is not controlled to be reduced. That is, when the stroke position is in the expansion side or the contraction side end range CT3, the spring force related to the spring member is not controlled to be reduced. Thus, it is possible to prevent the electromagnetic actuator 13 from falling into the full bump or full rebound state, and to meet a request to power saving.

The multiplier 67 of the spring control force calculation unit 53 calculates the value of the spring control force corrected based on the stroke position by multiplying the reference value of the spring control force calculated with reference to the spring control force map 63 by the value of the spring control force first correction ratio calculated with reference to the spring control force first reference ratio map 65. The value of the spring control force corrected based on the stroke position calculated in this way is sent to an adder 69 described next.

As shown in FIG. 4A, the driving force calculation unit 55 according to the first embodiment includes the damping force map 61 and the adder 69.

As shown in FIG. 4A, the reference value of the damping force which changes in association with a change in the relative speed is stored in the damping force map 61. Note that the reference value of the damping force is actually stored as a value of a damping force control current. In an example shown in FIG. 4A, the damping force is set logarithmically such that the damping force increases as the relative speed increases. This characteristic conforms to a characteristic of a hydraulic damper which has been conventionally used. When the relative speed is zero, the corresponding damping force is also zero. The driving force calculation unit 55 according to the first embodiment calculates the reference value of the damping force corresponding to the relative speed with reference to the relative speed acquired by the information acquisition unit 51 and above-described stored contents of the damping force map 61. The reference value of the damping force calculated in this way is sent to the adder 69.

The adder 69 of the driving force calculation unit 55 according to the first embodiment adds the value of the spring control force calculated by the spring control force calculation unit 53 to the reference value of the damping force calculated with reference to the damping force map 61, and thus generates the driving force control signal including the target driving force obtained by integrating the damping force and the spring control force. The driving force control signal including the target driving force generated in this way is sent to the drive control unit 57. In response to this, the drive control unit 57 controls driving of the plurality of electromagnetic actuators 13.

[Operation of Electromagnetic Suspension Apparatus 11 According to First Embodiment]

Next, an operation of the electromagnetic suspension apparatus 11 according to the first embodiment of the present invention will be described with reference to FIG. 5. FIG. 5 is a flowchart for explaining the operation of the electromagnetic suspension apparatus 11 according to the first to fourth embodiments of the present invention.

In Step S11 (acquisition of information including stroke position) shown in FIG. 5, the information acquisition unit 51 of the ECU 15 acquires a time-series signal of the rotation angle of the electric motor 31 detected by the resolver 37 and acquires the information on the stroke position of the electromagnetic actuators 13.

In Step S12 (relative speed calculation), the information acquisition unit 51 of the ECU 15 calculates the information on the relative speed between the sprung member and the unsprung member of the vehicle 10 by time-differentiating the time-series signal of the rotation angle of the electric motor 31 acquired in Step S11. The information on the relative speed acquired in this way is sent to the driving force calculation unit 55.

In Step S13 (spring control force calculation), the spring control force calculation unit 53 of the ECU 15 calculates the reference value of the spring control force corresponding to the stroke position with reference to the information on the stroke position acquired in Step S11 and the stored contents in the spring control force map 63. Further, the spring control force calculation unit 53 calculates the value of the spring control force first correction ratio corresponding to the stroke position with reference to the information on the stroke position acquired in Step S11 and the stored contents in the spring control force first correction ratio map 65. Furthermore, the multiplier 67 of the spring control force calculation unit 53 multiplies the reference value of the spring control force by the value of the spring control force first correction ratio. As described above, the spring control force calculation unit 53 corrects the reference value of the spring control force to the value suitable for the stroke position changing from moment to moment. The correction value of the spring control force calculated in this way is sent to the adder 69 of the driving force calculation unit 55.

In Step S14 (driving force calculation), the driving force calculation unit 55 of the ECU 15 calculates (acquires) the reference value of the damping force corresponding to the relative speed with reference to information on the relative speed between the sprung member and the unsprung member of the vehicle 10 calculated (acquired) by the information acquisition unit 51 in Step S12 and the stored contents in the damping force map 61 (reference value of the damping force which changes in association with the change in the relative speed). Next, as described above, the adder 69 of the driving force calculation unit 55 adds the reference value of the damping force corresponding to the relative speed to the correction value of the spring control force corresponding to the stroke position calculated by the spring control force calculation unit 53 in Step S13, and thus generates the driving force control signal including the target driving force obtained by integrating the damping force and the spring control force.

In Step S15, the drive control unit 57 of the ECU 15 supplies the drive control power to the electric motor 31 provided in each of the plurality of electromagnetic actuators 13 in accordance with the driving force control signal including the target driving force calculated by the calculation in Step S14, and thus controls driving of the plurality of electromagnetic actuators 13.

In the electromagnetic suspension apparatus 11 according to the first embodiment, the reference value of the damping force corresponding to the relative speed is calculated with reference to the damping force map 61, while the reference value of the spring control force corresponding to the stroke position is calculated with reference to the spring control force map 63, and the correction value of the spring control force is calculated by multiplying the reference value of the spring control force calculated in this way by the value of the spring control force first correction ratio corresponding to the stroke position, to control driving of the electromagnetic actuator 13 using the target driving force obtained by integrating the reference value of the damping force calculated as described above and the correction value of the spring control force. Here, when the stroke position is in the neutral range CT1 including the neutral position, the spring control force calculation unit 53 according to the first embodiment calculates a negative value having a large absolute value as the correction value of the spring control force, as compared with when the stroke position is in the non-neutral ranges CT2, CT3. This has the same meaning as reducing the spring force related to the mechanical spring member (reducing the spring constant related to the spring member). Therefore, the ride comfort can be improved.

With the electromagnetic suspension apparatus 11 according to the first embodiment, it is possible to meet a request to improve the ride comfort irrespective of a magnitude of the spring constant preset in the spring member.

[Block Configuration of Spring Control Force Calculation Unit 53, Driving Force Calculation Unit 55, and their Surroundings According to Second Embodiment]

Figure 6A:
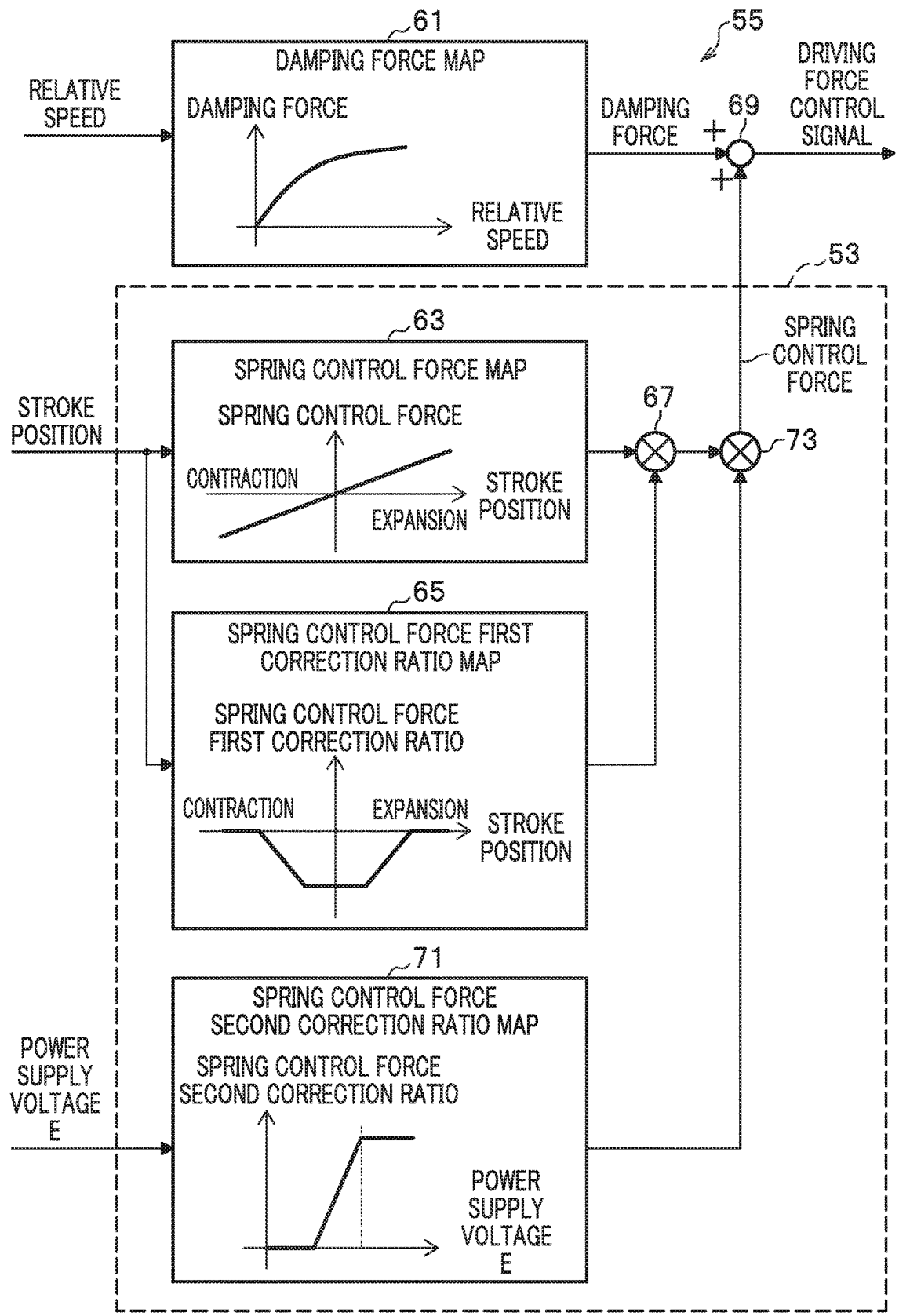
FIG. 6A is a block configuration diagram of the spring control force calculation unit, the driving force calculation unit, and their surroundings of the ECU provided in the electromagnetic suspension apparatus according to the second embodiment.

Next, a block configuration of the spring control force calculation unit 53, the driving force calculation unit 55, and their surroundings of the ECU 15 included in the electromagnetic suspension apparatus 11 according to the second embodiment will be described with reference to FIGS. 6A, 6B. FIG. 6A is a block configuration diagram of the spring control force calculation unit 53, the driving force calculation unit 55, and their surroundings according to the second embodiment. FIG. 6B is an explanatory diagram of a spring control force second correction ratio map 71 included in the driving force calculation unit 55 shown in FIG. 6A.

Here, the spring control force calculation unit 53 according to the first embodiment and the spring control force calculation unit 53 according to the second embodiment have many constituent elements common to both. Therefore, the spring control force calculation unit 53 according to the second embodiment will be described by focusing on different components between them. Note that the driving force calculation unit 55 according to the first embodiment and the driving force calculation unit 55 according to the second embodiment have mutually common configurations.

As shown in FIG. 6A, the spring control force calculation unit 53 according to the second embodiment is configured to include the spring control force second correction ratio map 71 and a multiplier 73 in addition to the spring control force map 63, the spring control force first correction ratio map 65, and the multiplier 67, which are constituent elements included in the spring control force calculation unit 53 according to the first embodiment.

As shown in FIG. 6A, a value of a spring control force second correction ratio which changes in association with the change in the power supply voltage E is stored in the spring control force second correction ratio map 71 provided in the spring control force calculation unit 53 according to the second embodiment. For the spring control force second correction ratio, a value between 0 and 1 (including 0 and 1) is used. In the spring control force calculation unit 53 according to the second embodiment, the value of the spring control force second correction ratio is multiplied by the correction value of the spring control force calculated by the spring control force calculation unit 53 according to the first embodiment. Thus, the correction value of the spring control force is corrected to a value suitable for the power supply voltage E changing from moment to moment.

Here, the spring control force second correction ratio characteristic stored in the spring control force second correction ratio map 71 will be described with reference to FIG. 6B. In a first power supply voltage range EA1 in which the power supply voltage E is less than a predetermined first voltage threshold value Eth1, zero is set as a value of a spring control force second correction ratio LT21. In a second power supply voltage range EA2 in which the power supply voltage E is not less than the first voltage threshold value Eth1 and less than a predetermined second voltage threshold value Eth2, a variable value is set as a value of a spring control force second correction ratio LT22 so as to be linearly reduced as the power supply voltage E is reduced. Further, in a third power supply voltage range EA3 in which the power supply voltage E is not less than the second voltage threshold value Eth2, the fixed value "1" is set as a value of a spring control force second correction ratio LT23. The first and second voltage threshold values Eth1, Eth2 are set to appropriate values through experiments, simulations or the like taking into consideration that it can be determined whether a capacity of an in-vehicle battery (not shown) is low and whether demand for electric power at that time is large.

It is because the following reason that the value of the spring control force second correction ratio LT21 is set to zero irrespective of the magnitude of the power supply voltage E in the first power supply voltage range EA1 in which the power supply voltage E is less than the first voltage threshold value Eth1, and the value of the spring control force second correction ratio LT22 is set so that the value of the spring control force is reduced as the power supply voltage E is reduced in the second power supply voltage range EA2 in which the power supply voltage E is not less than the first voltage threshold value Eth1 and less than the second voltage threshold value Eth2. That is, when the power supply voltage E is less than the second voltage threshold value Eth2, for example, it is assumed that the capacity of the in-vehicle battery (not shown) is low, or the demand for electric power at that time is large. In such a case, priority is given to meeting other electric power demands, as compared with improvement of the ride comfort. Therefore, when the power supply voltage E is in the first and second power supply voltage ranges EA1, EA2 less than the second voltage threshold value Eth2, the spring control force is corrected to reduce the degree of reducing the spring force related to the spring member, as compared with when the power supply voltage E is in the third power supply voltage range EA3 not less than the second voltage threshold value Eth2.

The spring control force calculation unit 53 according to the second embodiment calculates the value of the spring control force second correction ratio corresponding to the power supply voltage E with reference to the power supply voltage E acquired by the information acquisition unit 51 and the stored contents of the spring control force second correction ratio map 71. The value of the spring control force second correction ratio calculated in this way is sent to the multiplier 73.

The multiplier 73 of the spring control force calculation unit 53 according to the second embodiment multiplies the correction value of the spring control force calculated by the spring control force calculation unit 53 according to the first embodiment by the value of the spring control force second correction ratio based on the power supply voltage E calculated with reference to the spring control force second correction ratio map 71, and thus outputs the correction value of the spring control force corrected in view of the stroke position and the power supply voltage E. The correction value of the spring control force, which is corrected in view of the stroke position and the power supply voltage E and is output from the multiplier 73, is sent to the adder 69 of the driving force calculation unit 55 according to the second embodiment.

The adder 69 of the driving force calculation unit 55 according to the second embodiment adds the correction value of the spring control force corrected in view of the stroke position and the power supply voltage E to the reference value of the damping force calculated with reference to the damping force map 61, and thus generates the driving force control signal including the target driving force obtained by integrating the damping force and the spring control force. The driving force control signal including the target driving force thus generated is sent to the drive control unit 57. In response to this, the drive control unit 57 controls driving of the plurality of electromagnetic actuators 13.

[Operation of Electromagnetic Suspension Apparatus 11 According to Second Embodiment]

Next, an operation of the electromagnetic suspension apparatus 11 according to the second embodiment of the present invention will be described with reference to FIG. 5. Incidentally, the operation of the electromagnetic suspension apparatus 11 according to the second embodiment has many parts overlapping the operation of the electromagnetic suspension apparatus 11 according to the first embodiment. Therefore, the operation of the electromagnetic suspension apparatus 11 according to the second embodiment will be described by simplifying the description of operations common to both embodiments and focusing on different operations between both embodiments.

In Step S11 (acquisition of information including the stroke position) shown in FIG. 5, the information acquisition unit 51 of the ECU 15 acquires information on the time-series rotation angle signal of the electric motor 31, the stroke position of the electromagnetic actuator 13, and the power supply voltage E.

In Step S12 (relative speed calculation), the information acquisition unit 51 of the ECU 15 calculates information on the relative speed between the sprung member and the unsprung member of the vehicle 10.

In Step S13 (spring control force calculation), the spring control force calculation unit 53 of the ECU 15 calculates the reference value of the spring control force corresponding to the stroke position with reference to the information on the stroke position acquired in Step S11 and the stored contents in the spring control force map 63. Further, the spring control force calculation unit 53 calculates the value of the spring control force first correction ratio corresponding to the stroke position with reference to the information on the stroke position acquired in Step S11 and the stored contents of the spring control force first correction ratio map 65. Further, the multiplier 67 of the spring control force calculation unit 53 multiplies the reference value of the spring control force by the value of the spring control force first correction ratio, and outputs the correction value of the spring control force. On the other hand, the spring control force calculation unit 53 calculates the value of the spring control force second correction ratio corresponding to the power supply voltage E with reference to the information of the power supply voltage E acquired in Step S11 and the stored contents of the spring control force second correction ratio map 71. Further, the multiplier 73 of the spring control force calculation unit 53 multiplies the correction value of the spring control force, which is the output of the multiplier 67, by the value of the spring control force second correction ratio corresponding to the power supply voltage E, and outputs the correction value of the spring control force. As described above, the spring control force calculation unit 53 corrects the reference value of the spring control force to a value suitable for the stroke position and the power supply voltage E, which change from moment to moment. The correction value of the spring control force corrected in view of the stroke position and the power supply voltage E as described above is sent to the adder 69 of the driving force calculation unit 55.

In Step S14 (driving force calculation), the driving force calculation unit 55 of the ECU 15 calculates the reference value of the damping force corresponding to the relative speed. Next, the adder 69 of the driving force calculation unit 55 adds the reference value of the damping force corresponding to the relative speed, to the correction value of the spring control force, which is calculated by the spring control force calculation unit 53 in Step S13 and is corrected in view of the stroke position and the power supply voltage E, and thus generates the driving force control signal including the target driving force obtained by integrating the damping force and the spring control force.

In Step S15, the drive control unit 57 of the ECU 15 supplies the drive control power to the electric motor 31 provided in each of the plurality of electromagnetic actuators 13 in accordance with the driving force control signal including the target driving force calculated by the calculation in Step S14, and thus controls driving of the plurality of electromagnetic actuators 13.

In the electromagnetic suspension apparatus 11 according to the second embodiment, the reference value of the damping force corresponding to the relative speed is calculated with reference to the damping force map 61, while the reference value of the spring control force corresponding to the stroke position is calculated with reference to the spring control force map 63, and the correction value of the spring control force is calculated by multiplying the reference value of the spring control force calculated in this way by the value of the spring control force first correction ratio corresponding to the stroke position and the value of the spring control force second correction ratio corresponding to the power supply voltage E, to control driving of the electromagnetic actuator 13 using the target driving force obtained by integrating the reference value of the damping force calculated as described above and the correction value of the spring control force. Here, when the stroke position is in the neutral range CT1 including the neutral position, the spring control force calculation unit 53 according to the second embodiment calculates a negative value having a large absolute value as the correction value of the spring control force, as compared with when the stroke position is in the non-neutral ranges CT2, CT3. This has the same meaning as reducing the spring force related to the mechanical spring member (reducing the spring constant related to the spring member). Therefore, the ride comfort can be improved. Further, when the power supply voltage E is less than the second voltage threshold value Eth2, the spring control force calculation unit 53 according to the second embodiment corrects the spring control force to reduce the degree of reducing the spring force related to the spring member, as compared with when the power supply voltage E is not less than the second voltage threshold value Eth2. In this way, the priority is changed so as to meet the other electric power demand, as compared with the improvement of the ride comfort.

With the electromagnetic suspension apparatus 11 according to the second embodiment, it is possible to meet the request to improve the ride comfort irrespective of the magnitude of the spring constant preset in the spring member and to meet a request to give priority to the other electric power demand when the request is generated.

[Block Configuration of Spring Control Force Calculation Unit 53, Driving Force Calculation Unit 55, and their Surroundings According to Third Embodiment]

Figure 7A:
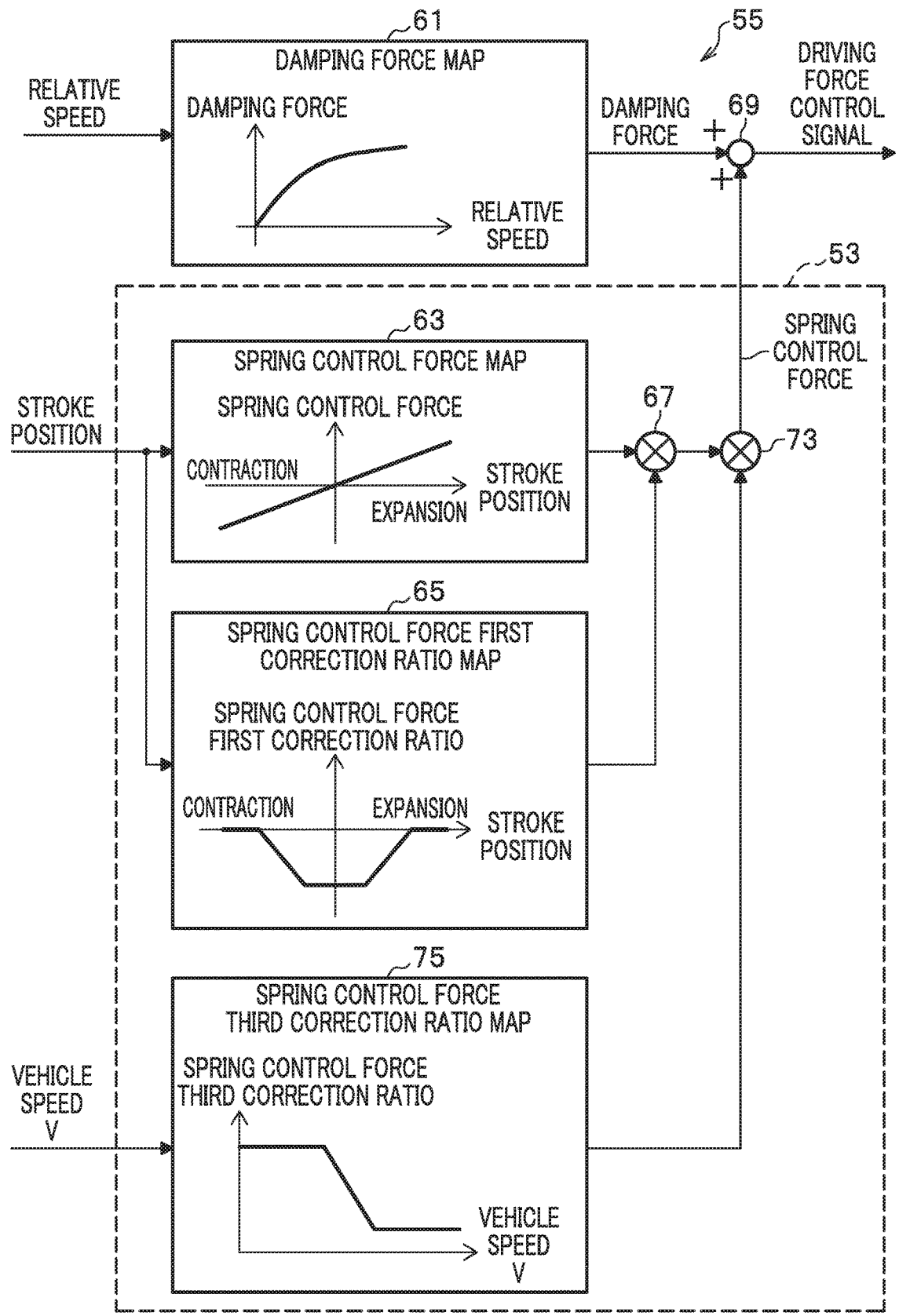
FIG. 7A is a block configuration diagram of the spring control force calculation unit, the driving force calculation unit, and their surroundings of the ECU provided in the electromagnetic suspension apparatus according to the third embodiment.

Next, a block configuration of the spring control force calculation unit 53, the driving force calculation unit 55, and their surroundings of the ECU 15 included in the electromagnetic suspension apparatus 11 according to the third embodiment will be described with reference to FIGS. 7A, 7B. FIG. 7A is a block configuration diagram of the spring control force calculation unit 53, the driving force calculation unit 55, and their surroundings according to the third embodiment. FIG. 7B is an explanatory diagram of a spring control force third correction ratio map 75 included in the driving force calculation unit 55 shown in FIG. 7A.

Here, the spring control force calculation unit 53 according to the first embodiment and the spring control force calculation unit 53 according to the third embodiment have many constituent elements common to both. Therefore, the spring control force calculation unit 53 according to the third embodiment will be described by focusing on different components between them. Note that the driving force calculation unit 55 according to the first embodiment and the driving force calculation unit 55 according to the third embodiment have mutually common configurations.

As shown in FIG. 7A, the spring control force calculation unit 53 according to the third embodiment is configured to include the spring control force third correction ratio map 75 and a multiplier 73 in addition to the spring control force map 63, the spring control force first correction ratio map 65, and the multiplier 67, which are constituent elements included in the spring control force calculation unit 53 according to the first embodiment.

As shown in FIG. 7A, a value of a spring control force third correction ratio which changes in association with the change in the vehicle speed V is stored in the spring control force third correction ratio map 75 provided in the spring control force calculation unit 53 according to the third embodiment. For the spring control force third correction ratio, a value between 0 and 1 (including 0 and 1) is used. In the spring control force calculation unit 53 according to the third embodiment, the value of the spring control force third correction ratio is multiplied by the correction value of the spring control force calculated by the spring control force calculation unit 53 according to the first embodiment. Thus, the correction value of the spring control force is corrected to a value suitable for the vehicle speed V changing from moment to moment.

Here, the spring control force third correction ratio characteristic stored in the spring control force third correction ratio map 75 will be described with reference to FIG. 7B. In a first vehicle speed range VA1 in which the vehicle speed V is not more than a predetermined first vehicle speed threshold value Vth1, the fixed value "1" is set as a value of a spring control force third correction ratio LT31. In a second vehicle speed range VA2 in which the vehicle speed V is more than the first vehicle speed threshold value Vth1 and not more than a second vehicle speed threshold value Vth2, a variable value is set as a value of a spring control force third correction ratio LT32 so as to be linearly reduced as the vehicle speed V increases. Further, in a third vehicle speed range VA3 in which the vehicle speed V exceeds the second vehicle speed threshold value Vth2, the fixed value "0.25" is set as a value of a spring control force third correction ratio LT33. The first and second vehicle speed threshold values Vth1, Vth2 are set to appropriate values through experiments, simulations or the like taking into consideration that it is possible to determine a branch point where a balance between the request to improve the ride comfort and the request to secure the steering stability is broken.

It is because the following reason that the value of the spring control force third correction ratio LT31 is set to the fixed value "1" so that the value of the spring control force increases irrespective of the change in the vehicle speed V in the first vehicle speed range VA1 in which the vehicle speed V is not more than the first vehicle speed threshold value Vth1. That is, when the vehicle speed V is not more than the first vehicle speed threshold value Vth1, it is assumed that the request to improve the ride comfort apparently exceeds the request to secure the steering stability (during low speed running). In such a case, the priority is given to meeting the request to improve the ride comfort, as compared with securing the steering stability. Therefore, in the first vehicle speed range VA1 in which the vehicle speed V is not more than the first vehicle speed threshold value Vth1, the spring control force is corrected to increase the degree of reducing the spring force related to the spring member as compared with when the vehicle speed V exceeds the first vehicle speed threshold value Vth1.

It is because the following reason that the value of the spring control force third correction ratio LT32 is set so that the value of the spring control force is reduced as the vehicle speed V increases, in the second vehicle speed range VA2 in which the vehicle speed V is more than the first vehicle speed threshold value Vth1 and not more than the second vehicle speed threshold value Vth2. That is, when the vehicle speed V is more than the first vehicle speed threshold value Vth1 and not more than the second vehicle speed threshold value Vth2, a transition period (during middle speed running) until the request to secure the steering stability exceeds the request to improve the ride comfort is assumed. In such a case, it is convenient if it is possible to adjust the degree of satisfaction of the request to secure the steering stability and the request to improve the ride comfort in accordance with a level of the vehicle speed V. Therefore, in the second vehicle speed range VA2 in which the vehicle speed V exceeds the first vehicle speed threshold value Vth1 and is not more than the second vehicle speed threshold value Vth2, the spring control force is corrected to adjust the degree of reducing the spring force related to the spring member in accordance with the level of the vehicle speed V.

It is because the following reason that the value of the spring control force third correction ratio LT33 is set to the fixed value ("0.25" in an example of FIG. 7B) so that the value of the spring control force is reduced irrespective of the change in the vehicle speed V in the third vehicle speed range VA3 in which the vehicle speed V exceeds the second vehicle speed threshold value Vth2. That is, when the vehicle speed V exceeds the second vehicle speed threshold value Vth2, it is assumed that the request to secure the steering stability apparently exceeds the request to improve the ride comfort (during high speed running). In such a case, the priority is given to meeting the request to secure the steering stability, as compared with the request to improve the ride comfort. Therefore, in the third vehicle speed range VA3 in which the vehicle speed V exceeds the second vehicle speed threshold value Vth2, the spring control force is corrected to reduce the degree of reducing the spring force related to the spring member as compared with when the vehicle speed V is not more than the second vehicle speed threshold value Vth2.

The spring control force calculation unit 53 according to the third embodiment calculates the value of the control force third correction ratio corresponding to the vehicle speed V with reference to the vehicle speed V acquired by the information acquisition unit 51 and the stored contents of the spring control force third correction ratio map 75. The value of the spring control force third correction ratio thus calculated is sent to the multiplier 73.

The multiplier 73 of the spring control force calculation unit 53 according to the third embodiment multiplies the correction value of the spring control force calculated by the spring control force calculation unit 53 according to the first embodiment by the value of the spring control force third correction ratio based on the vehicle speed V calculated with reference to the spring control force third correction ratio map 75, and thus outputs the correction value of the spring control force corrected in view of the stroke position and the vehicle sped V. The correction value of the spring control force, which is corrected in view of the stroke position and the vehicle speed V and is output from the multiplier 73, is sent to the adder 69 of the driving force calculation unit 55 according to the third embodiment.

The adder 69 of the driving force calculation unit 55 according to the third embodiment adds the correction value of the spring control force corrected in view of the stroke position and the vehicle speed V to the reference value of the damping force calculated with reference to the damping force map 61, and thus generates the driving force control signal including the target driving force obtained by integrating the damping force and the spring control force. The driving force control signal including the target driving force thus generated is sent to the drive control unit 57. In response to this, the drive control unit 57 controls driving of the plurality of electromagnetic actuators 13.

[Operation of Electromagnetic Suspension Apparatus 11 According to Third Embodiment]

Next, an operation of the electromagnetic suspension apparatus 11 according to the third embodiment of the present invention will be described with reference to FIG. 5. Incidentally, the operation of the electromagnetic suspension apparatus 11 according to the third embodiment has many parts overlapping the operation of the electromagnetic suspension apparatus 11 according to the first embodiment. Therefore, the operation of the electromagnetic suspension apparatus 11 according to the third embodiment will be described by simplifying the description of operations common to both embodiments and focusing on different operations between both embodiments.

In Step S11 (acquisition of information including the stroke position) shown in FIG. 5, the information acquisition unit 51 of the ECU 15 acquires information on the time-series rotation angle signal of the electric motor 31, the stroke position of the electromagnetic actuator 13, and the vehicle speed V.

In Step S12 (relative speed calculation), the information acquisition unit 51 of the ECU 15 calculates information on the relative speed between the sprung member and the unsprung member of the vehicle 10.

In Step S13 (spring control force calculation), the spring control force calculation unit 53 of the ECU 15 calculates the reference value of the spring control force corresponding to the stroke position with reference to the information on the stroke position acquired in Step S11 and the stored contents in the spring control force map 63. Further, the spring control force calculation unit 53 calculates the value of the spring control force first correction ratio corresponding to the stroke position with reference to the information on the stroke position acquired in Step S11 and the stored contents of the spring control force first correction ratio map 65. Further, the multiplier 67 of the spring control force calculation unit 53 multiplies the reference value of the spring control force by the value of the spring control force first correction ratio, and outputs the correction value of the spring control force. On the other hand, the spring control force calculation unit 53 calculates the value of the spring control force third correction ratio corresponding to the vehicle speed V with reference to the information of the vehicle speed V acquired in Step S11 and the stored contents of the spring control force third correction ratio map 75. Further, the multiplier 73 of the spring control force calculation unit 53 multiplies the correction value of the spring control force, which is the output of the multiplier 67, by the value of the spring control force third correction ratio corresponding to the vehicle speed V, and outputs the correction value of the spring control force. As described above, the spring control force calculation unit 53 corrects the reference value of the spring control force to a value suitable for the stroke position and the vehicle speed V, which change from moment to moment. The correction value of the spring control force corrected in view of the stroke position and the vehicle speed V as described above is sent to the adder 69 of the driving force calculation unit 55.

In Step S14 (driving force calculation), the driving force calculation unit 55 of the ECU 15 calculates the reference value of the damping force corresponding to the relative speed. Next, the adder 69 of the driving force calculation unit 55 adds the reference value of the damping force corresponding to the relative speed, to the correction value of the spring control force, which is calculated by the spring control force calculation unit 53 in Step S13 and is corrected in view of the stroke position and the vehicle speed V, and thus generates the driving force control signal including the target driving force obtained by integrating the damping force and the spring control force.

In Step S15, the drive control unit 57 of the ECU 15 supplies the drive control power to the electric motor 31 provided in each of the plurality of electromagnetic actuators 13 in accordance with the driving force control signal including the target driving force calculated by the calculation in Step S14, and thus controls driving of the plurality of electromagnetic actuators 13.

In the electromagnetic suspension apparatus 11 according to the third embodiment, the reference value of the damping force corresponding to the relative speed is calculated with reference to the damping force map 61, while the reference value of the spring control force corresponding to the stroke position is calculated with reference to the spring control force map 63, and the correction value of the spring control force is calculated by multiplying the reference value of the spring control force calculated in this way by the value of the spring control force first correction ratio corresponding to the stroke position and the value of the spring control force third correction ratio corresponding to the vehicle speed V, to control driving of the electromagnetic actuator 13 using the target driving force obtained by integrating the reference value of the damping force calculated as described above and the correction value of the spring control force. Here, when the stroke position is in the neutral range CT1 including the neutral position, the spring control force calculation unit 53 according to the third embodiment calculates a negative value having a large absolute value as the correction value of the spring control force, as compared with when the stroke position is in the non-neutral ranges CT2, CT3. This has the same meaning as reducing the spring force related to the mechanical spring member (reducing the spring constant related to the spring member). Therefore, the ride comfort can be improved. Further, when the vehicle speed V exceeds the second vehicle speed threshold value Vth2, the spring control force calculation unit 53 according to the third embodiment corrects the spring control force to reduce the degree of reducing the spring force related to the spring member, as compared with when the vehicle speed V is not more than the second vehicle speed threshold value Vth2. In this way, the priority is changed so as to meet the request to ensure the steering stability, as compared with the request to improve the ride comfort.

With the electromagnetic suspension apparatus 11 according to the third embodiment, it is possible to meet the request to improve the ride comfort irrespective of the magnitude of the spring constant preset in the spring member and to meet a request to give priority to ensuring the steering stability when the request is generated.

[Block Configuration of Spring Control Force Calculation Unit 53, Driving Force Calculation Unit 55, and their Surroundings According to Fourth Embodiment]

Figure 8A:
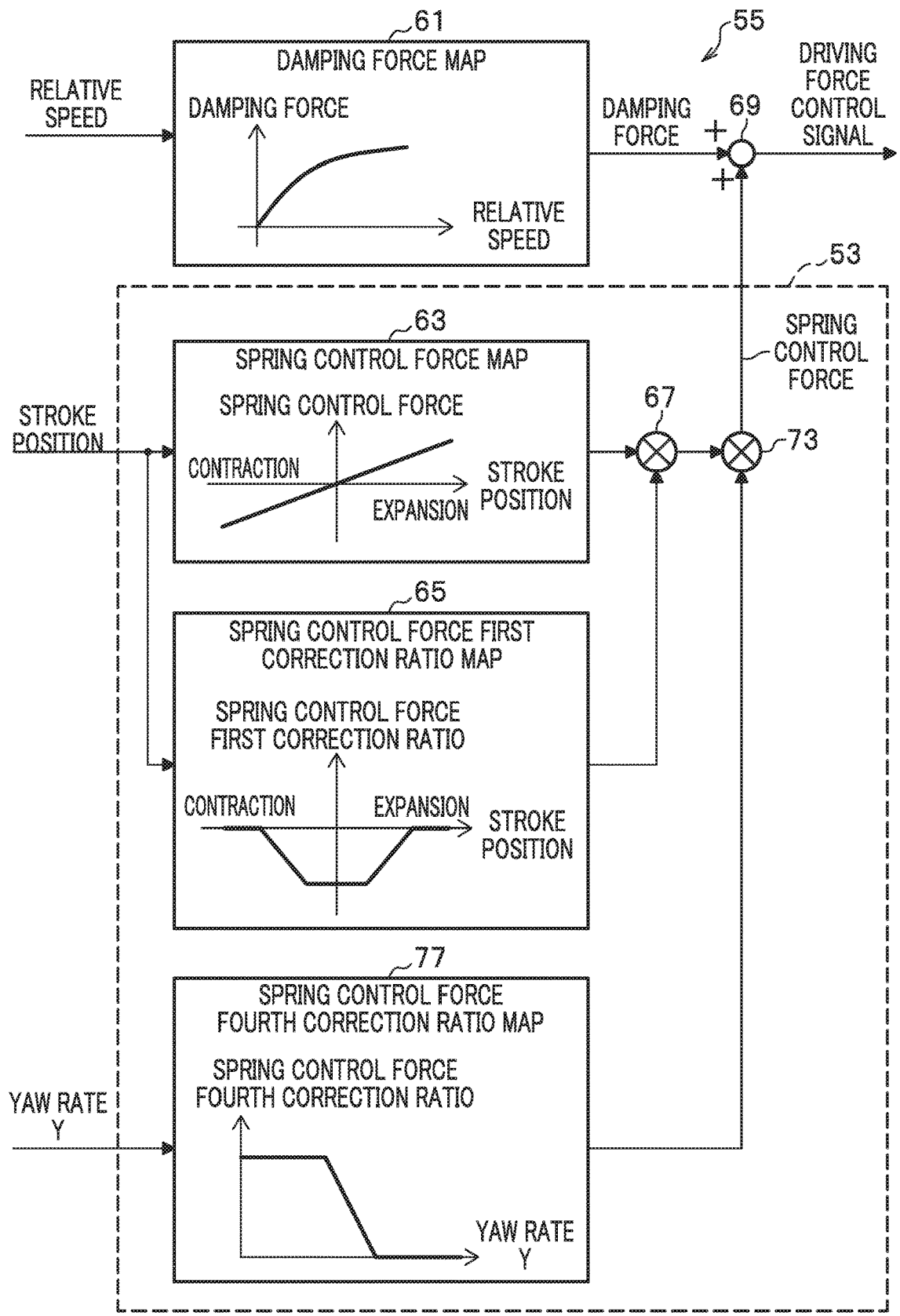
FIG. 8A is a block configuration diagram of the spring control force calculation unit, the driving force calculation unit, and their surroundings of the ECU provided in the electromagnetic suspension apparatus according to the fourth embodiment.
Figure 8B:
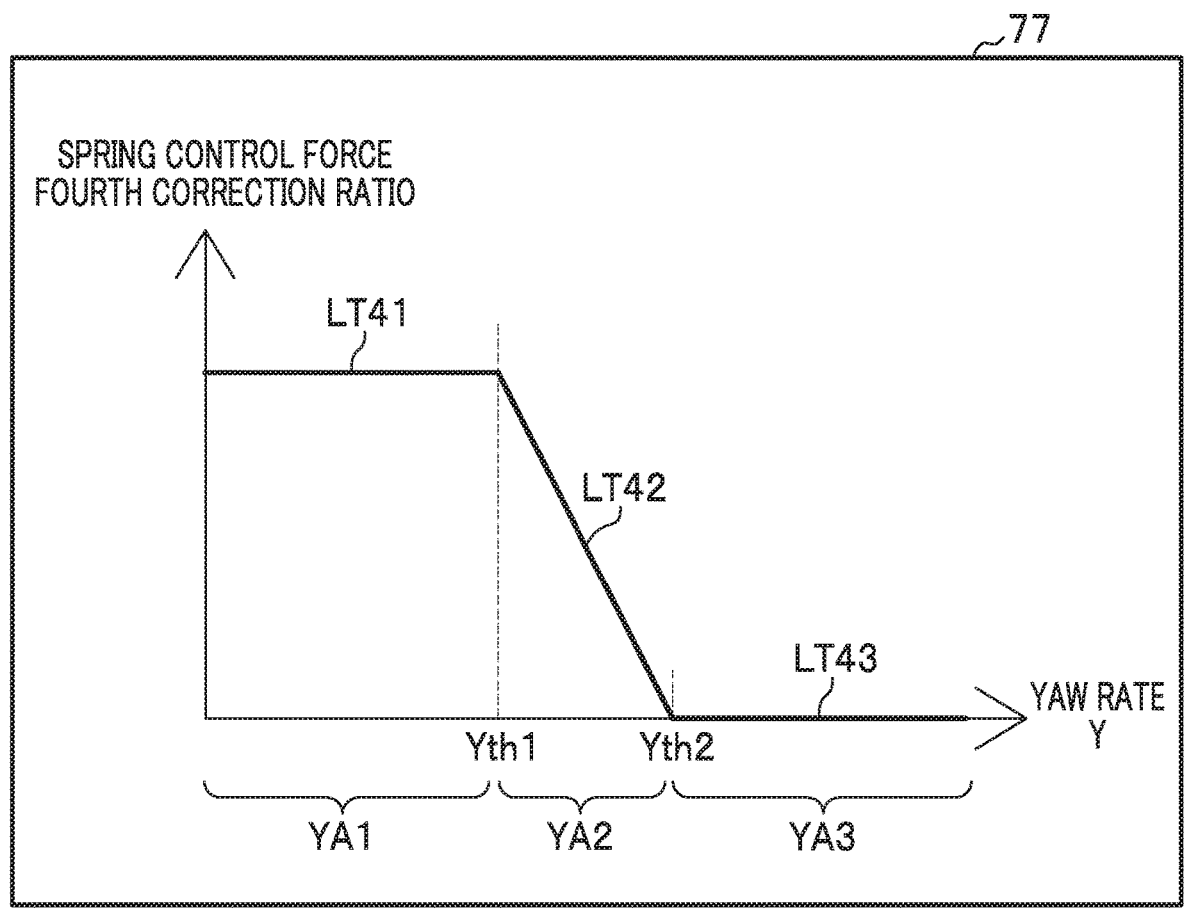
FIG. 8B is an explanatory diagram of a spring control force fourth correction ratio map included in the driving force calculation unit shown in FIG. 8A.

Next, a block configuration of the spring control force calculation unit 53, the driving force calculation unit 55, and their surroundings of the ECU 15 included in the electromagnetic suspension apparatus 11 according to the fourth embodiment will be described with reference to FIGS. 8A, 8B. FIG. 8A is a block configuration diagram of the spring control force calculation unit 53, the driving force calculation unit 55, and their surroundings according to the fourth embodiment. FIG. 8B is an explanatory diagram of a spring control force fourth correction ratio map 77 included in the driving force calculation unit 55 shown in FIG. 8A.

Here, the spring control force calculation unit 53 according to the first embodiment and the spring control force calculation unit 53 according to the fourth embodiment have many constituent elements common to both. Therefore, the spring control force calculation unit 53 according to the fourth embodiment will be described by focusing on different components between them. Note that the driving force calculation unit 55 according to the first embodiment and the driving force calculation unit 55 according to the fourth embodiment have mutually common configurations.

As shown in FIG. 8A, the spring control force calculation unit 53 according to the fourth embodiment is configured to include the spring control force fourth correction ratio map 77 and a multiplier 73 in addition to the spring control force map 63, the spring control force first correction ratio map 65, and the multiplier 67, which are constituent elements included in the spring control force calculation unit 53 according to the first embodiment.

As shown in FIG. 8A, a value of a spring control force fourth correction ratio which changes in association with the change in the yaw rate Y is stored in the spring control force fourth correction ratio map 77 provided in the spring control force calculation unit 53 according to the fourth embodiment. For the spring control force fourth correction ratio, a value between 0 and 1 (including 0 and 1) is used. In the spring control force calculation unit 53 according to the fourth embodiment, the value of the spring control force fourth correction ratio is multiplied by the correction value of the spring control force calculated by the spring control force calculation unit 53 according to the first embodiment. Thus, the correction value of the spring control force is corrected to a value suitable for the yaw rate Y changing from moment to moment.

Here, the spring control force fourth correction ratio characteristic stored in the spring control force fourth correction ratio map 77 will be described with reference to FIG. 8B. In a first steering range YA1 in which the yaw rate Y is not more than a predetermined first steering threshold value Yth1, the fixed value "1" is set as a value of a spring control force fourth correction ratio LT41. In a second steering range YA2 in which the yaw rate Y is more than the first steering threshold value Yth1 and not more than a second steering threshold value Yth2, a variable value is set as a value of a spring control force fourth correction ratio LT42 so as to be linearly reduced as the yaw rate Y increases. Further, in a third steering range YA3 in which the yaw rate Y exceeds the second steering threshold value Yth2, the fixed value "0" is set as a value of a spring control force fourth correction ratio LT43. The first and second steering threshold values Yth1, Yth2 are set to appropriate values through experiments, simulations or the like taking into consideration that it is possible to determine the branch point where the balance between the request to improve the ride comfort and the request to secure the steering stability is broken.

It is because the following reason that the value of the spring control force fourth correction ratio LT41 is set to the fixed value "1" so that the value of the spring control force increases irrespective of the change in the yaw rate Y in the first steering range YA1 in which the yaw rate Y is not more than the first steering threshold value Yth1. That is, when the yaw rate Y is not more than the first steering threshold value Yth1, it is assumed that the request to improve the ride comfort apparently exceeds the request to secure the steering stability (for example, during running on a straight road). In such a case, the priority is given to meeting the request to improve the ride comfort, as compared with securing the steering stability. Therefore, in the first steering range YA1 in which the yaw rate Y is not more than the first steering threshold value Yth1, the spring control force is corrected to increase the degree of reducing the spring force related to the spring member as compared with when the yaw rate Y exceeds the first steering threshold value Yth1.

It is because the following reason that the value of the spring control force fourth correction ratio LT42 is set so that the value of the spring control force is reduced as the yaw rate Y increases, in the second steering range YA2 in which the yaw rate Y is more than the first steering threshold value Yth1 and not more than the second steering threshold value Yth2. That is, when the yaw rate Y is more than the first steering threshold value Yth1 and not more than the second steering threshold value Yth2, a transition period (for example, during running on a gently curved road) until the request to secure the steering stability exceeds the request to improve the ride comfort is assumed. In such a case, it is convenient if it is possible to adjust the degree of satisfaction of the request to secure the steering stability and the request to improve the ride comfort in accordance with a level of the yaw rate Y. Therefore, in the second steering range YA2 in which the yaw rate Y exceeds the first steering threshold value Yth1 and is not more than the second steering threshold value Yth2, the spring control force is corrected to adjust the degree of reducing the spring force related to the spring member in accordance with the level of the yaw rate Y.

It is because the following reason that the value of the spring control force fourth correction ratio LT43 is set to the fixed value ("0" in an example of FIG. 8B) so that the value of the spring control force is reduced irrespective of the change in the yaw rate Y in the third steering range YA3 in which the yaw rate Y exceeds the second steering threshold value Yth2. That is, when the yaw rate Y exceeds the second steering threshold value Yth2, it is assumed that the request to secure the steering stability apparently exceeds the request to improve the ride comfort (for example, during running on a sharply curved road). In such a case, the priority is given to meeting the request to secure the steering stability, as compared with the request to improve the ride comfort. Therefore, in the third steering range YA3 in which the yaw rate Y exceeds the second steering threshold value Yth2, the spring control force is corrected to reduce the degree of reducing the spring force related to the spring member as compared with when the yaw rate Y is not more than the second steering threshold value Yth2. Incidentally, "reducing the degree of reducing the spring force related to the spring member" includes a mode in which the spring force related to the spring member is not controlled to be reduced. When the yaw rate Y exceeds the second steering threshold value Yth2, the spring force related to the spring member is not controlled to be reduced. Thus, it is possible to meet the request to ensure the steering stability and the request to power saving.

The spring control force calculation unit 53 according to the fourth embodiment calculates the value of the control force fourth correction ratio corresponding to the yaw rate Y with reference to the yaw rate Y acquired by the information acquisition unit 51 and the stored contents of the spring control force fourth correction ratio map 77. The value of the spring control force fourth correction ratio thus calculated is sent to the multiplier 73.

The multiplier 73 of the spring control force calculation unit 53 according to the fourth embodiment multiplies the correction value of the spring control force calculated by the spring control force calculation unit 53 according to the first embodiment by the value of the spring control force fourth correction ratio based on the yaw rate Y calculated with reference to the spring control force fourth correction ratio map 77, and thus outputs the correction value of the spring control force corrected in view of the stroke position and the yaw rate Y. The correction value of the spring control force, which is corrected in view of the stroke position and the yaw rate Y and is output from the multiplier 73, is sent to the adder 69 of the driving force calculation unit 55 according to the fourth embodiment.

The adder 69 of the driving force calculation unit 55 according to the fourth embodiment adds the correction value of the spring control force corrected in view of the stroke position and the yaw rate Y to the reference value of the damping force calculated with reference to the damping force map 61, and thus generates the driving force control signal including the target driving force obtained by integrating the damping force and the spring control force. The driving force control signal including the target driving force thus generated is sent to the drive control unit 57. In response to this, the drive control unit 57 controls driving of the plurality of electromagnetic actuators 13.

[Operation of Electromagnetic Suspension Apparatus 11 According to Fourth Embodiment]

Next, an operation of the electromagnetic suspension apparatus 11 according to the fourth embodiment of the present invention will be described with reference to FIG. 5. Incidentally, the operation of the electromagnetic suspension apparatus 11 according to the fourth embodiment has many parts overlapping the operation of the electromagnetic suspension apparatus 11 according to the first embodiment. Therefore, the operation of the electromagnetic suspension apparatus 11 according to the fourth embodiment will be described by simplifying the description of operations common to both embodiments and focusing on different operations between both embodiments.

In Step S11 shown in FIG. 5, the information acquisition unit 51 of the ECU 15 acquires information on the time-series rotation angle signal of the electric motor 31, the stroke position of the electromagnetic actuator 13, and the yaw rate Y.

In Step S12, the information acquisition unit 51 of the ECU 15 calculates information on the relative speed between the sprung member and the unsprung member of the vehicle 10.

In Step S13, the spring control force calculation unit 53 of the ECU 15 calculates the reference value of the spring control force corresponding to the stroke position with reference to the information on the stroke position acquired in Step S11 and the stored contents in the spring control force map 63. Further, the spring control force calculation unit 53 calculates the value of the spring control force first correction ratio corresponding to the stroke position with reference to the information on the stroke position acquired in Step S11 and the stored contents of the spring control force first correction ratio map 65. Further, the multiplier 67 of the spring control force calculation unit 53 multiplies the reference value of the spring control force by the value of the spring control force first correction ratio, and outputs the correction value of the spring control force. On the other hand, the spring control force calculation unit 53 calculates the value of the spring control force fourth correction ratio corresponding to the yaw rate Y with reference to the information of the yaw rate Y acquired in Step S11 and the stored contents of the spring control force fourth correction ratio map 77. Further, the multiplier 73 of the spring control force calculation unit 53 multiplies the correction value of the spring control force, which is the output of the multiplier 67, by the value of the spring control force fourth correction ratio corresponding to the yaw rate Y, and outputs the correction value of the spring control force. As described above, the spring control force calculation unit 53 corrects the reference value of the spring control force to a value suitable for the stroke position and the yaw rate Y, which change from moment to moment. The correction value of the spring control force corrected in view of the stroke position and the yaw rate Y as described above is sent to the adder 69 of the driving force calculation unit 55.

In Step S14, the driving force calculation unit 55 of the ECU 15 calculates the reference value of the damping force corresponding to the relative speed. Next, the adder 69 of the driving force calculation unit 55 adds the reference value of the damping force corresponding to the relative speed, to the correction value of the spring control force, which is calculated by the spring control force calculation unit 53 in Step S13 and is corrected in view of the stroke position and the yaw rate Y, and thus generates the driving force control signal including the target driving force obtained by integrating the damping force and the spring control force.

In Step S15, the drive control unit 57 of the ECU 15 supplies the drive control power to the electric motor 31 provided in each of the plurality of electromagnetic actuators 13 in accordance with the driving force control signal including the target driving force calculated by the calculation in Step S14, and thus controls driving of the plurality of electromagnetic actuators 13.

In the electromagnetic suspension apparatus 11 according to the fourth embodiment, the reference value of the damping force corresponding to the relative speed is calculated with reference to the damping force map 61, while the reference value of the spring control force corresponding to the stroke position is calculated with reference to the spring control force map 63, and the correction value of the spring control force is calculated by multiplying the reference value of the spring control force calculated in this way by the value of the spring control force first correction ratio corresponding to the stroke position and the value of the spring control force fourth correction ratio corresponding to the yaw rate Y, to control driving of the electromagnetic actuator 13 using the target driving force obtained by integrating the reference value of the damping force calculated as described above and the correction value of the spring control force. Here, when the stroke position is in the neutral range CT1 including the neutral position, the spring control force calculation unit 53 according to the fourth embodiment calculates a negative value having a large absolute value as the correction value of the spring control force, as compared with when the stroke position is in the non-neutral ranges CT2, CT3. This has the same meaning as reducing the spring force related to the mechanical spring member (reducing the spring constant related to the spring member). Therefore, the ride comfort can be improved. Further, when the yaw rate Y exceeds the second steering threshold value Yth2, the spring control force calculation unit 53 according to the fourth embodiment corrects the spring control force to reduce the degree of reducing the spring force related to the spring member, as compared with when the yaw rate Y is not more than the second steering threshold value Yth2. In this way, the priority is changed so as to meet the request to ensure the steering stability, as compared with the request to improve the ride comfort.

With the electromagnetic suspension apparatus 11 according to the fourth embodiment, it is possible to meet the request to improve the ride comfort irrespective of the magnitude of the spring constant preset in the spring member and to meet the request to give priority to ensuring the steering stability when the request is generated.

[Operational Effect of Electromagnetic Suspension Apparatus 11 According to the Present Invention]

Next, an operational effect of the electromagnetic suspension apparatus 11 according to the present invention will be described. The electromagnetic suspension apparatus 11 according to a first aspect includes the electromagnetic actuator 13 that is provided in parallel with the spring member provided between the vehicle body and the wheel of the vehicle 10 and generates the driving force related to vibration damping of the vehicle body, the information acquisition unit 51 that acquires the information on the stroke position of the electromagnetic actuator 13, and the ECU (driving force control unit) 15 that calculates the target driving force of the electromagnetic actuator 13 and controls the driving force of the electromagnetic actuator 13 using the calculated target driving force. When the stroke position acquired by the information acquisition unit 51 is in the neutral range CT1 including the neutral position, the ECU (driving force control unit) 15 corrects the target driving force to reduce the spring force related to the spring member as compared with when the stroke position is in the non-neutral ranges CT2, CT3.

With the electromagnetic suspension apparatus 11 according to the first aspect, when the stroke position is in the neutral range CT1 including the neutral position, since the ECU (driving force control unit) 15 corrects the target driving force to reduce the spring force related to the spring member as compared with when the stroke position is in the non-neutral ranges CT2, CT3, it is possible to meet the request to improve the ride comfort irrespective of the magnitude of the spring constant preset in the spring member.

The electromagnetic suspension apparatus 11 according to a second aspect includes the electromagnetic actuator 13 that is provided in parallel with the spring member provided between the vehicle body and the wheel of the vehicle 10 and generates the driving force related to vibration damping of the vehicle body, the information acquisition unit 51 that acquires the information on the stroke position of the electromagnetic actuator 13, the spring control force calculation unit 53 that calculates the spring control force generated in the electromagnetic actuator 13 based on the stroke position acquired by the information acquisition unit 51, a relative speed correlation value calculation unit (the information acquisition unit 51) that calculates a relative speed correlation value between the sprung member and the unsprung member with respect to the spring member in the vehicle body, and the ECU (driving force control unit) 15 that calculates the target driving force of the electromagnetic actuator 13 based on the relative speed correlation value calculated (acquired) by the information acquisition unit 51 and the spring control force calculated by the spring control force calculation unit 53, and controls the driving force of the electromagnetic actuator 13 using the calculated target driving force. When the stroke position acquired by the information acquisition unit 51 is in the neutral range CT1 including the neutral position, the ECU (driving force control unit) 15 corrects the target driving force to reduce the spring force related to the spring member as compared with when the stroke position is in the non-neutral ranges CT2, CT3.

With the electromagnetic suspension apparatus 11 according to the second aspect, similarly to the electromagnetic suspension apparatus 11 according to the first aspect, when the stroke position is in the neutral range CT1 including the neutral position, since the ECU (driving force control unit) 15 corrects the target driving force to reduce the spring force related to the spring member as compared with when the stroke position is in the non-neutral ranges CT2, CT3, it is possible to meet the request to improve the ride comfort irrespective of the magnitude of the spring constant preset in the spring member.

The electromagnetic suspension apparatus 11 according to a third aspect is the electromagnetic suspension apparatus 11 according to the first aspect or the second aspect, wherein the information acquisition unit 51 further acquires the information on the power supply voltage E supplied to the electromagnetic actuator 13, and when the power supply voltage E is less than the second voltage threshold value Eth2 acquired by the information acquisition unit 51, the ECU (driving force control unit) 15 corrects the target driving force to reduce the degree of reducing the spring force related to the spring member as compared with when the power voltage E is not less than the second voltage threshold value Eth2.

With the electromagnetic suspension apparatus 11 according to the third aspect, when the power supply voltage E acquired by the information acquisition unit 51 is less than the predetermined second voltage threshold value Eth2, the ECU (driving force control unit) 15 corrects the target driving force to reduce the degree of reducing spring force related to the spring member as compared with when the power supply voltage E is not less than the second voltage threshold value Eth2, it is possible to meet the request to improve the ride comfort irrespective of the magnitude of the spring constant preset in the spring member and to meet the request to give priority to the other electric power demand when the request is generated.

The electromagnetic suspension apparatus 11 according to a fourth aspect is the electromagnetic suspension apparatus 11 according to any one of the first to third aspects, wherein the information acquisition unit 51 further acquires the vehicle speed V, and when the vehicle speed V acquired by the information acquisition unit 51 exceeds the predetermined first vehicle speed threshold value Vth1, the ECU (driving force control unit) 15 corrects the target driving force to reduce the degree of reducing the spring force related to the spring member as compared with when the vehicle speed V is not more than the first vehicle speed threshold value Vth1.

Here, when the vehicle speed V exceeds the predetermined vehicle speed threshold value Vth1, it is assumed that the vehicle speed V is in a range where the vehicle speed V exceeds a medium speed. In such a case, the priority is given to meeting the request to improve the road holding performance (steering stability) of the unsprung member as compared with the request to improve the ride comfort of the vehicle 10. In order to meet this request, it is preferable to reduce the control to reduce the spring force of the spring member (that is, to increase the spring force of the spring member). Therefore, in the electromagnetic suspension apparatus 11 according to the fourth aspect, when the vehicle speed V exceeds the first vehicle speed threshold value Vth1, the target driving force is corrected to reduce the degree of reducing the spring force related to the spring member as compared with when the vehicle speed V is not more than the first vehicle speed threshold value Vth1. Incidentally, reducing the spring force of the spring member has the same meaning as reducing the spring constant related to the spring member. Generally, when the spring constant related to the spring member is reduced, the ride comfort is improved, while increasing the spring constant related to the spring member is advantageous for improving the steering stability. Further, reducing the degree of reducing the spring force of the spring member means to improve the steering stability (suppress the improving effect of the ride comfort) by reducing the degree of reducing the spring constant related to the spring member.

In the electromagnetic suspension apparatus 11 according to the fourth aspect, when the vehicle speed V exceeds the first vehicle speed threshold value Vth1, the target driving force is corrected to reduce the degree of reducing the spring force related to the spring member as compared with when the vehicle speed V is not more than the first vehicle speed threshold value Vth1, and thus it is possible to meet the request to improve the ride comfort irrespective of the magnitude of the spring constant preset in the spring member and to meet the request to give priority to ensuring the steering stability when the request is generated.

The electromagnetic suspension apparatus 11 according to a fifth aspect is the electromagnetic suspension apparatus 11 according to the first to fourth aspects, wherein the information acquisition unit 51 further acquires the information related to the steering (yaw rate Y), and when the yaw rate Y acquired by the information acquisition unit 51 exceeds the predetermined steering threshold value Yth1, the ECU (driving force control unit) 15 corrects the target driving force to reduce the degree of reducing the spring force related to the spring member as compared with when the yaw rate Y is not more than the steering threshold value Yth1.

Here, when the yaw rate Y exceeds the steering threshold value Yth1, it is assumed that the vehicle 10 is turning. In such a case, the priority is given to meeting the request to improve the road holding performance (steering stability) of the unsprung member as compared with the request to improve the ride comfort of the vehicle 10. In order to meet this request, it is preferable to reduce the control to reduce the spring force of the spring member (that is, to increase the spring force of the spring member). Therefore, in the electromagnetic suspension apparatus 11 according to the fifth aspect, when the yaw rate Y exceeds the steering threshold value Yth1, the target driving force is corrected to reduce the degree of reducing the spring force related to the spring member as compared with when the yaw rate Y is not more than the steering threshold value Yth1.

In the electromagnetic suspension apparatus 11 according to the fifth aspect, when the yaw rate Y exceeds the steering threshold value Yth1, the target driving force is corrected to reduce the degree of reducing the spring force related to the spring member as compared with when the yaw rate Y is not more than the steering threshold value Yth1, and thus it is possible to meet the request to improve the ride comfort irrespective of the magnitude of the spring constant preset in the spring member and to meet the request to give priority to ensuring the steering stability when the request is generated.

Other Embodiments

The plural embodiments described above are examples of implementation of the present invention. Therefore, the technical scope of the present invention should not be interpreted limitedly by these. This is because the present invention can be implemented in various forms without departing from the spirits and scope of the present invention.

For example, in the description of the internal configuration of the ECU 15 commonly provided in the electromagnetic suspension apparatus 11 of the present invention, an example of the information acquisition unit 51 that acquires the information on the stroke speed of the electromagnetic actuator 13, the sprung speed, the unsprung speed, the roll velocity, the pitch velocity, the yaw rate Y, and the vehicle speed V has been described, however, the present invention is not limited to this example. The information acquisition unit may be the information acquisition unit 51 (corresponding to the first embodiment) that acquires information on the stroke speed, the information acquisition unit 51 (corresponding to the second embodiment) that acquires information on the stroke speed and the sprung speed, the information acquisition unit 51 (corresponding to the third embodiment) that acquires information on the stroke speed and the unsprung speed, the information acquisition unit 51 (corresponding to the fourth embodiment) that acquires information on the stroke speed and the roll velocity, the information acquisition unit 51 (corresponding to the fifth embodiment) that acquires information on the stroke speed and the pitch velocity, or the information acquisition unit 51 (corresponding to a sixth embodiment) that acquires information on the stroke speed, the sprung speed, the unsprung speed, the roll velocity, and the pitch velocity.

In the description of the internal configuration of the ECU 15 of the electromagnetic suspension apparatus 11 according to the seventh embodiment of the present invention, an example of the information acquisition unit 51 that acquires the information on the stroke speed of the electromagnetic actuator 13, the sprung speed, the unsprung speed, the roll velocity, the pitch velocity, the yaw rate Y, and the vehicle speed V has been described, however, the present invention is not limited to this example. In the information acquisition unit 51 of the ECU 15 of the electromagnetic suspension apparatus 11 according to a modification of the seventh embodiment of the present invention, it may be configured to acquire one of the stroke speed of the electromagnetic actuator 13, the sprung speed, the unsprung speed, the roll velocity, the pitch velocity, the yaw rate Y, and the vehicle speed V. In the information acquisition unit 51 of the ECU 15 of the electromagnetic suspension apparatus 11 according to the modification of the seventh embodiment of the present invention, it may be configured to acquire at least one of the stroke direction, the lateral acceleration, the steering angle, the steering torque, and an ambient temperature around the electromagnetic actuator 13, in addition to the information on the stroke speed of the electromagnetic actuator 13, the sprung speed, the unsprung speed, the roll velocity, the pitch velocity, the yaw rate Y, and the vehicle speed V. In this case, in the electromagnetic suspension apparatus 11 according to the modification of the seventh embodiment of the present invention, it is configured such that the spring control force is corrected based on the information on the stroke direction of the electromagnetic actuator 13, the lateral acceleration of the vehicle 10, the steering angle, the steering torque, or the ambient temperature around the electromagnetic actuator 13.

Further, in the description of the embodiment according to the present invention, an example in which a total of four electromagnetic actuators 13 are arranged in both the front wheels (left front wheel/right front wheel) and the rear wheels (left rear wheel/right rear wheel) has been described, however, the present invention is not limited to this example. A configuration in which two electromagnetic actuators 13 are conveniently arranged in either the front wheel or the rear wheel may be adopted.

Finally, in the description of the embodiment according to the present invention, the drive control unit 57 that independently controls the driving of the plurality of electromagnetic actuators 13 has been described. Specifically, the drive control unit 57 may independently control the driving of the electromagnetic actuators 13 respectively provided in the four wheels, separately for wheels. Further, the drive control unit 57 may independently control the driving of the electromagnetic actuators 13 respectively provided for the four wheels, separately for the front wheels and for the rear wheels, or separately for the left wheels and the right wheels.

REFERENCE SIGNS LIST

10: vehicle
11: electromagnetic suspension apparatus
13: electromagnetic actuator
15: ECU (driving force control unit)
51: information acquisition unit (relative speed correlation value calculation unit)
53: spring control force calculation unit
55: driving force calculation unit
57: drive control unit
E: power supply voltage
V: vehicle speed
Y: yaw rate

The invention claimed is:
1. An electromagnetic suspension apparatus comprising:
an electromagnetic actuator that is provided in parallel with a spring member provided between a vehicle body and a wheel of a vehicle and generates a driving force related to vibration damping of the vehicle body;
an information acquisition unit that acquires information on a stroke position of the electromagnetic actuator; and
a driving force control unit that calculates a target driving force of the electromagnetic actuator and controls a driving force of the electromagnetic actuator using the calculated target driving force, wherein
when the stroke position acquired by the information acquisition unit is in a neutral range including a neutral position, the driving force control unit corrects the target driving force so as to reduce a spring constant related to the spring member as compared with when the stroke position is in a non-neutral range.

2. An electromagnetic suspension apparatus comprising:
an electromagnetic actuator that is provided in parallel with a spring member provided between a vehicle body and a wheel of a vehicle and generates a driving force related to vibration damping of the vehicle body;
an information acquisition unit that acquires information on a stroke position of the electromagnetic actuator;
a spring control force calculation unit that calculates a spring control force generated by the electromagnetic actuator based on the stroke position acquired by the information acquisition unit;
a relative speed correlation value calculation unit included in the information acquisition unit that calculates a relative speed correlation value between a sprung member and an unsprung member with respect to the spring member in the vehicle body; and
a driving force control unit that calculates a target driving force of the electromagnetic actuator based on the relative speed correlation value calculated by the relative speed correlation value calculation unit and the spring control force calculated by the spring control force calculation unit, and controls a driving force of the electromagnetic actuator using the calculated target driving force; wherein when the stroke position acquired by the information acquisition unit is in a neutral range including a neutral position, the driving force control unit corrects the target driving force so as to reduce a spring force related to the spring member as compared with when the stroke position is in a non-neutral range.

3. The electromagnetic suspension apparatus according to claim 1, wherein the information acquisition unit further acquires information on a power supply voltage supplied to the electromagnetic actuator, and when the power supply voltage acquired by the information acquisition unit is less than a predetermined voltage threshold value, the driving force control unit corrects the target driving force so as to reduce the degree of reducing the spring constant related to the spring member as compared with when the power supply voltage is not less than the voltage threshold value.

4. The electromagnetic suspension apparatus according to claim 1, wherein the information acquisition unit further acquires information on a vehicle speed, and when the vehicle speed acquired by the information acquisition unit exceeds a predetermined vehicle speed threshold value, the driving force control unit corrects the target driving force so as to reduce the degree of reducing the spring constant related to the spring member as compared with when the vehicle speed is not higher than the vehicle speed threshold value.

5. The electromagnetic suspension apparatus according to claim 1, wherein the information acquisition unit further acquires information on steering, and when the information on steering acquired by the information acquisition unit exceeds a predetermined steering threshold value, the driving force control unit corrects the target driving force so as to reduce the degree of reducing the spring constant related to the spring member as compared with when the information on steering is not higher than the steering threshold value.

6. The electromagnetic suspension apparatus according to claim 1, further comprising:

a spring control force calculation unit that calculates a spring control force generated by the electromagnetic actuator based on the stroke position acquired by the information acquisition unit.

* * * * *